United States Patent
Tanabe et al.

(10) Patent No.: US 10,698,541 B2
(45) Date of Patent: Jun. 30, 2020

(54) ELECTRONIC DEVICE, RECORDING MEDIUM, AND CONTROL METHOD

(71) Applicant: KYOCERA Corporation, Kyoto (JP)

(72) Inventors: Shigeki Tanabe, Yokohama (JP); Yasuhiro Ueno, Yokohama (JP); Hideki Morita, Yokohama (JP); Isao Masuike, Machida (JP); Koutaro Yamauchi, Yokohama (JP); Manabu Sakuma, Yokohama (JP); Kenji Shimada, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/035,809

(22) Filed: Jul. 16, 2018

(65) Prior Publication Data

US 2019/0034001 A1 Jan. 31, 2019

(30) Foreign Application Priority Data

Jul. 28, 2017 (JP) .................................. 2017-146837

(51) Int. Cl.
```
G09G 5/00      (2006.01)
G06F 3/044     (2006.01)
G06F 21/31     (2013.01)
G06F 3/03      (2006.01)
G06F 3/01      (2006.01)
G06F 3/041     (2006.01)
G06F 3/0488    (2013.01)
```

(52) U.S. Cl.
CPC .............. *G06F 3/044* (2013.01); *G06F 3/017* (2013.01); *G06F 3/0304* (2013.01); *G06F 3/0412* (2013.01); *G06F 3/0416* (2013.01); *G06F 3/04883* (2013.01); *G06F 21/31* (2013.01)

(58) Field of Classification Search
CPC ...... G06F 3/044; G06F 3/0441; G06F 3/0442; G06F 3/0443; G06F 3/0444; G06F 3/0445; G06F 3/0446; G06F 3/0447; G06F 3/0448; G06F 3/017; G06F 3/0304; G06F 3/0412
USPC .......................... 345/156, 157, 174; 455/566
See application file for complete search history.

(56) References Cited

U.S. PATENT DOCUMENTS

| | | | |
|---|---|---|---|
| 8,963,875 B2 | 2/2015 | Sugiura et al. | |
| 9,100,582 B2 | 8/2015 | Aoki | |
| 9,355,236 B1 | 5/2016 | Kratz et al. | |
| 9,618,609 B2 | 4/2017 | Shirasaka et al. | |
| 2012/0137253 A1* | 5/2012 | Eom | G06F 3/0481 715/835 |
| 2012/0249470 A1 | 10/2012 | Sugiura et al. | |
| 2012/0313848 A1* | 12/2012 | Galor | G06F 3/005 345/156 |
| 2014/0211036 A1 | 7/2014 | Aoki | |
| 2015/0346831 A1 | 12/2015 | Nii | |

(Continued)

FOREIGN PATENT DOCUMENTS

| | | |
|---|---|---|
| JP | 2008-158763 A | 7/2008 |
| JP | 2012-216053 A | 11/2012 |

(Continued)

*Primary Examiner* — Jennifer T Nguyen

(74) *Attorney, Agent, or Firm* — Studebaker & Brackett PC

(57) ABSTRACT

An electronic device includes a proximity sensor, a touch sensor, and a controller that turns the proximity sensor on when it is judged that the electronic device is wet on the basis of an output of the touch sensor.

4 Claims, 17 Drawing Sheets

(56) References Cited

U.S. PATENT DOCUMENTS

| | | | |
|---|---|---|---|
| 2016/0162146 A1* | 6/2016 | Wu | G06F 3/0488 715/776 |
| 2016/0178735 A1 | 6/2016 | Shirasaka et al. | |
| 2017/0068331 A1* | 3/2017 | Tomokiyo | G06F 3/0488 |
| 2017/0071573 A1 | 3/2017 | Takahashi | |
| 2018/0059798 A1 | 3/2018 | Matsubara et al. | |

FOREIGN PATENT DOCUMENTS

| | | |
|---|---|---|
| JP | 2014-146862 A | 8/2014 |
| JP | 2015-201174 A | 11/2015 |
| JP | 2015-225493 A | 12/2015 |
| JP | 2015-231518 A | 12/2015 |
| WO | 2015/037293 A1 | 3/2015 |
| WO | 2016/132876 A1 | 8/2016 |

* cited by examiner

ELECTRONIC DEVICE, RECORDING MEDIUM, AND CONTROL METHOD

CROSS-REFERENCE TO RELATED APPLICATION

The present application claims priority to and the benefit of Japanese Patent Application No. 2017-146837 filed Jul. 28, 2017, the entire contents of which are incorporated herein by reference.

TECHNICAL FIELD

The present disclosure relates to an electronic device, a recording medium, and a control method.

BACKGROUND

Electronic devices, such as smartphones and tablets, typically include a touch panel. A user typically controls such an electronic device by touching the touch panel. An electronic device that detects a gesture performed by the user at a distance from the terminal using a proximity sensor, such as an infrared sensor, and then processes an input operation corresponding to the gesture has been proposed in recent years

SUMMARY

An electronic device according to an embodiment includes a proximity sensor, a touch sensor, and a controller. The controller turns the proximity sensor on when it is judged that the electronic device is wet on the basis of an output of the touch sensor.

An electronic device according to an embodiment includes a proximity sensor, a touch sensor, and a controller. The controller executes processing on the basis of a gesture detected by the proximity sensor when it is judged that the electronic device is wet on the basis of an output of the touch sensor.

A non-transitory computer-readable recording medium according to an embodiment includes computer program instructions to be executed by an electronic device including a proximity sensor, a touch sensor, and a controller, the instructions causing the electronic device to turn the proximity sensor on, using the controller, when it is judged that the electronic device is wet on the basis of an output of the touch sensor.

A non-transitory computer-readable recording medium according to an embodiment includes computer program instructions to be executed by an electronic device including a proximity sensor, a touch sensor, and a controller, the instructions causing the electronic device to execute processing, using the controller, on the basis of a gesture detected by the proximity sensor when it is judged that the electronic device is wet on the basis of an output of the touch sensor.

A control method according to an embodiment is for an electronic device including a proximity sensor, a touch sensor, and a controller. The control method includes turning the proximity sensor on, using the controller, when it is judged that the electronic device is wet on the basis of an output of the touch sensor.

A control method according to an embodiment is for an electronic device including a proximity sensor, a touch sensor, and a controller. The control method includes executing processing, using the controller, on the basis of a gesture detected by the proximity sensor when it is judged that the electronic device is wet on the basis of an output of the touch sensor.

DETAILED DESCRIPTION

The conventionally known gesture-based input operation is, for example, for operating a mobile phone by performing an execution gesture with a finger when the user cannot touch the mobile phone. However, even if the user cannot touch the conventionally known mobile phone, gesture-based operations cannot be accepted unless the mobile phone is in a state enabling gesture-based operations. Therefore, the conventionally known mobile phone is not always very convenient.

In light of these considerations, it would be helpful to provide an electronic device, a recording medium, and a control method that can improve convenience.

Embodiments are described in detail below with reference to the drawings. In the present disclosure, a smartphone is described as an example of the electronic device. The electronic device may, however, be an apparatus other than a smartphone.

Configuration of Smartphone

Figure 1:
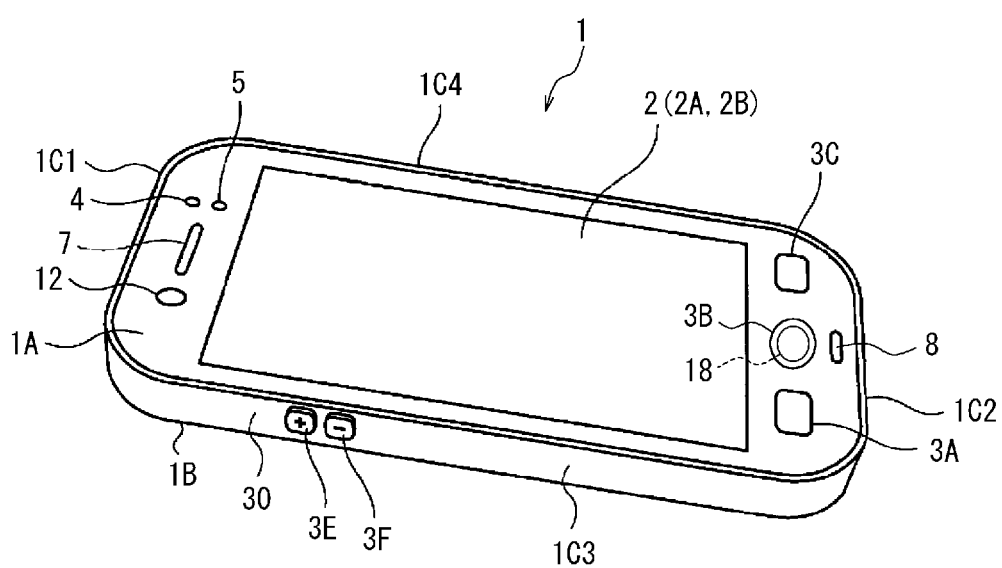
FIG. 1 is a perspective view of a smartphone according to an embodiment.
Figure 2:
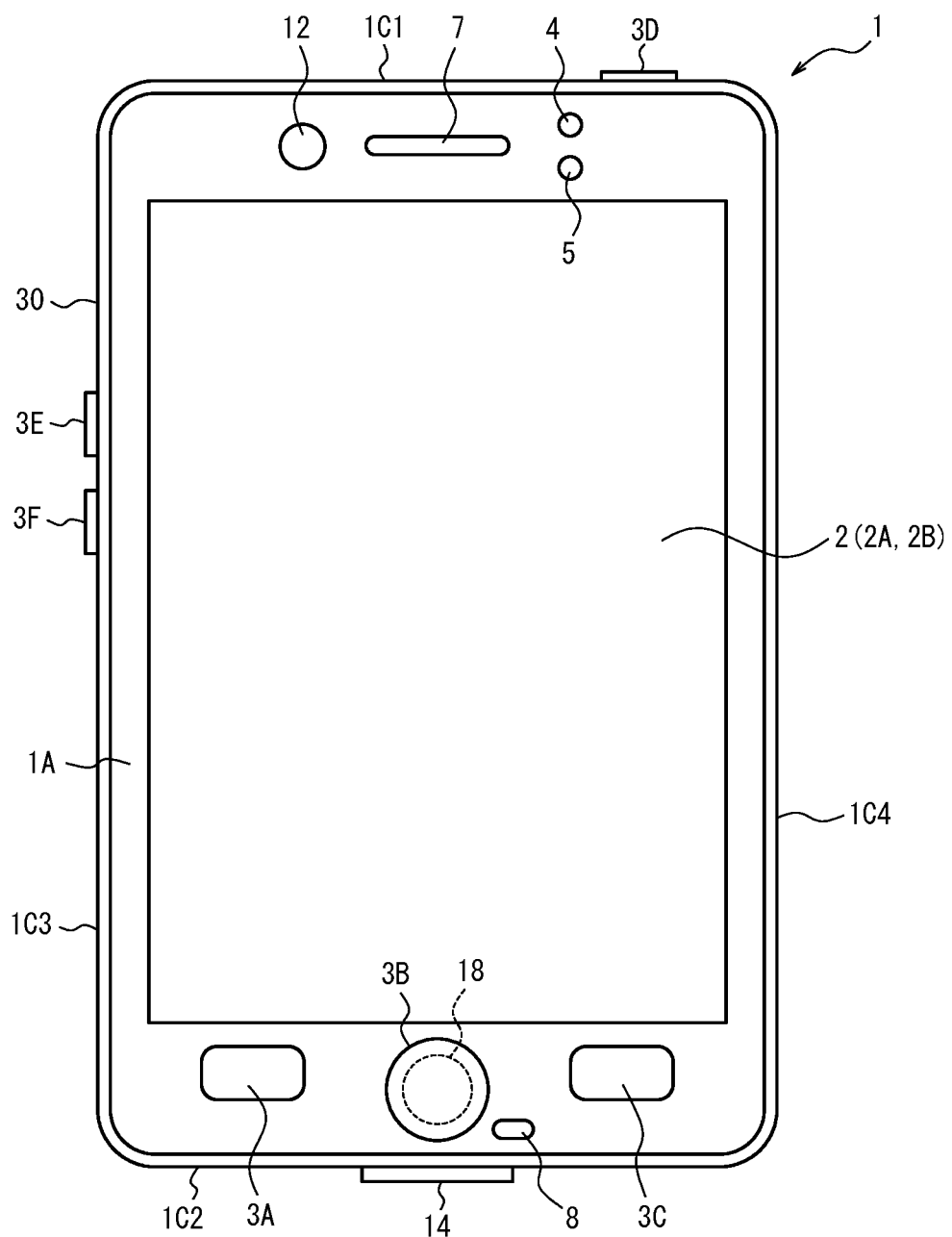
FIG. 2 is a front view of the smartphone in FIG. 1.
Figure 3:
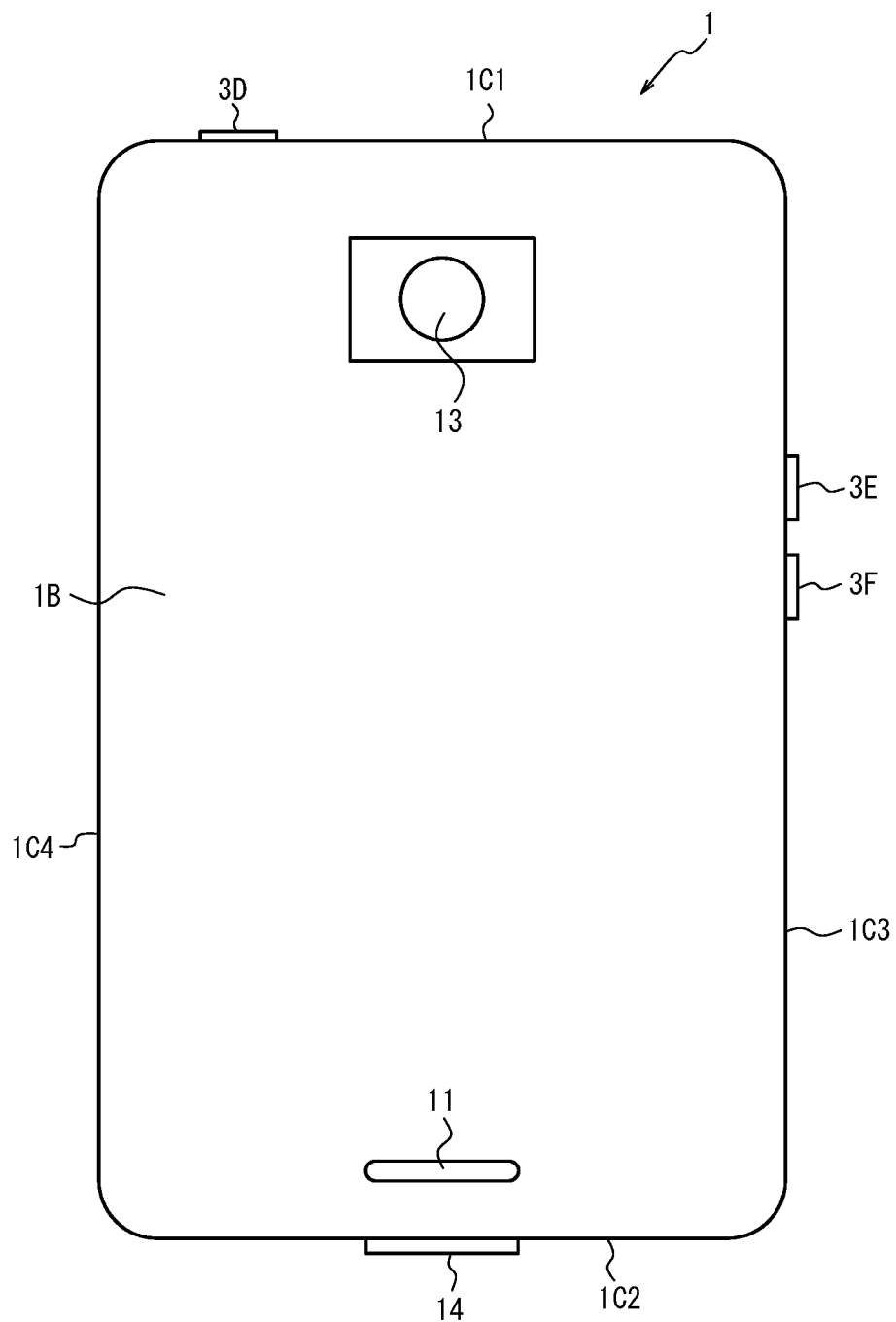
FIG. 3 is a back view of the smartphone in FIG. 1.

The overall configuration of a smartphone 1 according to an embodiment is described with reference to FIGS. 1 to 3. As illustrated in FIGS. 1 to 3, a smartphone 1 serving as an example of an electronic device 1 includes a housing 30. The housing 30 includes a front face 1A, a back face 1B, and side faces 1C1 to 1C4. The front face 1A is the front surface of the housing 30. The back face 1B is the back surface of the housing 30. The side faces 1C1 to 1C4 are side surfaces that connect the front face 1A and the back face 1B. The side faces 1C1 to 1C4 may be collectively referred to below as the side faces 1C without further distinction.

On the front face 1A, the smartphone 1 includes a touchscreen display 2, operation interfaces 3A to 3C, an illuminance sensor 4, a proximity sensor 5, a receiver 7, a microphone 8, a camera 12, and a fingerprint sensor 18. The smartphone 1 includes a speaker 11 and a camera 13 on the back face 1B. The smartphone 1 also includes operation interfaces 3D to 3F and a connector 14 on the side faces 1C. The operation interfaces 3A to 3F may be collectively referred to below as the operation interfaces 3 without further distinction.

The touchscreen display 2 includes a display 2A and a touchscreen 2B. In the example in FIG. 1, the display 2A and the touchscreen 2B are each substantially rectangular, but the display 2A and the touchscreen 2B are not limited to being rectangular. The display 2A and the touchscreen 2B may each have any other shape, such as a square or a circle. In the example in FIG. 1, the display 2A and the touchscreen 2B are arranged in overlap, but the display 2A and the touchscreen 2B are not limited to this arrangement. The display 2A and the touchscreen 2B may, for example, be arranged side by side or at a distance from each other. In the example in FIG. 1, the long sides of the display 2A are parallel with the long sides of the touchscreen 2B, and the short sides of the display 2A are parallel with the short sides of the touchscreen 2B, but the display 2A and the touchscreen 2B are not limited to being overlapped in this way. The display 2A and the touchscreen 2B may, for example, be arranged in overlap so that one or more sides of the display 2A is not parallel with any of the sides of the touchscreen 2B.

The display 2A includes a display device such as a liquid crystal display (LCD), an organic electro-luminescence display (OELD), or an inorganic electro-luminescence display (IELD). The display 2A displays objects such as letters, images, symbols, and graphics on the screen. The screen that includes objects such as letters, images, symbols, and graphics displayed by the display 2A includes a screen called a lock screen, a screen called a home screen, and an application screen displayed during execution of an application. The lock screen is a screen displayed when use of at least a portion of functions of the smartphone 1 is restricted. In other words, the smartphone 1 can be in a state in which use of some functions is restricted and a state in which use of functions is not restricted. The state in which use of some functions is restricted is also referred to as a "locked state". The lock screen is displayed on the display 2A, for example, when the smartphone 1 is in the locked state. In the locked state, the user can use a photography function using the camera 12 or 13, for example. The state in which use of functions is not restricted is also referred to as an "unlocked state". The home screen is displayed on the display 2A, for example, when the smartphone 1 is in the unlocked state. The home screen is also called a desktop, standby screen, idle screen, standard screen, application list screen, or launcher screen. The display 2A is an example of a display.

In the unlocked state, the user can execute all of the functions executable by the smartphone 1, for example.

The touchscreen 2B detects contact on the touchscreen 2B by a finger, pen, stylus, or the like. The touchscreen 2B can detect the positions on the touchscreen 2B contacted by a plurality of fingers, pens, styli, or the like.

Any detection system may be used in the touchscreen 2B, such as a capacitive system, a resistive film system, a surface acoustic wave system (or an ultrasonic wave system), an infrared system, an electromagnetic induction system, or a load detection system. It is assumed below that the user touches a finger to the touchscreen 2B to operate the smartphone 1.

The smartphone 1 determines the type of input operation on the basis of at least one of contact detected by the touchscreen 2B, the position of the detected contact, a change in the position of the detected contact, the interval between detections of contact, and the number of times contact is detected. The input operation is an operation on the touchscreen 2B. Input operations that can be distinguished by the smartphone 1 include, but are not limited to, a touch, a long touch, a release, a swipe, a tap, a double tap, a long tap, a drag, a flick, a pinch-in, and a pinch-out, for example.

The smartphone 1 operates in accordance with these input operations that are distinguished via the touchscreen 2B. The smartphone 1 thus implements an intuitive, easy-to-use interface for the user. The operations performed by the smartphone 1 in accordance with the distinguished input operations may differ in accordance with the screen being displayed on the display 2A. For the sake of simplicity, "the touchscreen 2B detects contact, and the smartphone 1 determines the type of input operation to be X on the basis of the detected contact" is also referred to below as "the smartphone 1 detects X", or as "the controller detects X".

The fingerprint sensor 18 scans (detects) the fingerprint at a fingertip as an image. In the present embodiment, the fingerprint sensor 18 is built into the operation interface 3B. The fingerprint sensor 18 of the present embodiment can therefore detect the fingerprint of a finger touching the operation interface 3B. The fingerprint sensor 18 outputs the scanned image as fingerprint information. When, for example, the fingerprint sensor 18 is a semiconductor capacitive sensor, the fingerprint sensor 18 detects the charge, of a plurality of electrodes, that changes due to the pattern of a fingerprint. The fingerprint sensor 18 then converts the amount of charge into an image. The fingerprint sensor 18 is not limited to a semiconductor capacitive sensor and may instead be an optical sensor or an ultrasonic sensor. The fingerprint sensor 18 is described as being built into the operation interface 3B in the present embodiment, but this configuration is not limiting. For example, the fingerprint sensor 18 may be provided independently on the front face 1A or the side faces 1C3, 1C4, or the like of the housing 30 within a range operable by the thumb of the hand with which the user holds the smartphone 1. The fingerprint sensor 18 may, for example, operate intermittently. The fingerprint sensor 18 may, for example, activate and operate when a predetermined condition is satisfied, such as the display 2A turning on in response to the operation interface 3 being pressed.

The operation interfaces 3 are operation buttons operated by the user. The operation interfaces 3 are disposed on the housing 30 so as to be pressable by the user. The operation interfaces 3 include operation interfaces 3A to 3F. A controller 10 cooperates with the operation interfaces 3 to detect operations on the operation interfaces 3. The operations on the operation interfaces 3 may include, but are not limited to, a click, a double-click, a triple-click, and a push, for example.

The operation interfaces 3A to 3C are, for example, a home button, a back button, or a menu button. The operation interface 3D is, for example, a power button for the smartphone 1. By operating (pressing) the operation interface 3D, the user can switch the display of the display 2A on and off. The operation interface 3D may also serve as a button to enable/disable a sleep mode. The operation interfaces 3E and 3F are, for example, volume buttons.

The illuminance sensor 4 detects the illuminance from surrounding light around the smartphone 1. The illuminance is the value of luminous flux incident on a measurement surface of the illuminance sensor 4 per unit area. The illuminance sensor 4 may, for example, be used to adjust the luminance of the display 2A.

Without contact, the proximity sensor 5 detects the relative distance to an object near the smartphone 1, the movement direction of the object, and the like. In the present embodiment, the proximity sensor 5 includes one infrared light emitting diode (LED) acting as a light source and four infrared photodiodes. The proximity sensor 5 emits infrared light, from the infrared LED acting as a light source, towards an object. Reflected light from the object is incident on the infrared photodiodes of the proximity sensor 5. The proximity sensor 5 can measure the relative distance to the object on the basis of the output current of the infrared photodiodes. The proximity sensor 5 also detects the movement direction of the object by the difference in time at which reflected light from the object is incident on each of the infrared photodiodes. The proximity sensor 5 can thus detect an operation by an air gesture (gesture) that the user of the smartphone 1 performs without touching the smartphone 1. The proximity sensor 5 may include visible light photodiodes. In the present embodiment, the proximity sensor 5 may be provided on the same surface of the smartphone 1 as the touchscreen display 2.

The receiver 7 and the speaker 11 are sound output interfaces. For example, the receiver 7 and the speaker 11 output sound signals, transmitted from the controller 10 of the smartphone 1, as sound. The receiver 7 is, for example, used to output the other party's voice during a phone call. The speaker 11 is, for example, used to output a ringtone and music. One of the receiver 7 and the speaker 11 may also serve the functions of the other. The microphone 8 is a sound input interface. The microphone 8 converts the user's speech or the like to a sound signal and transmits the sound signal to the controller 10.

The camera 12 is a front camera that images an object facing the front face 1A. The camera 13 is a back camera that images an object facing the back face 1B.

The connector 14 is a terminal to which another apparatus connects. The connector 14 may be a universal terminal such as a universal serial bus (USB) terminal, a high-definition multimedia interface (HDMI® (HDMI is a registered trademark in Japan, other countries, or both)) terminal, Light Peak (Thunderbolt® (Thunderbolt is a registered trademark in Japan, other countries, or both)), or an earphone microphone connector. The connector 14 may be a dedicated terminal, such as a Dock connector. The apparatuses that may connect to the connector 14 include, but are not limited to, an external storage, a speaker, and a communication apparatus, for example.

Figure 4:
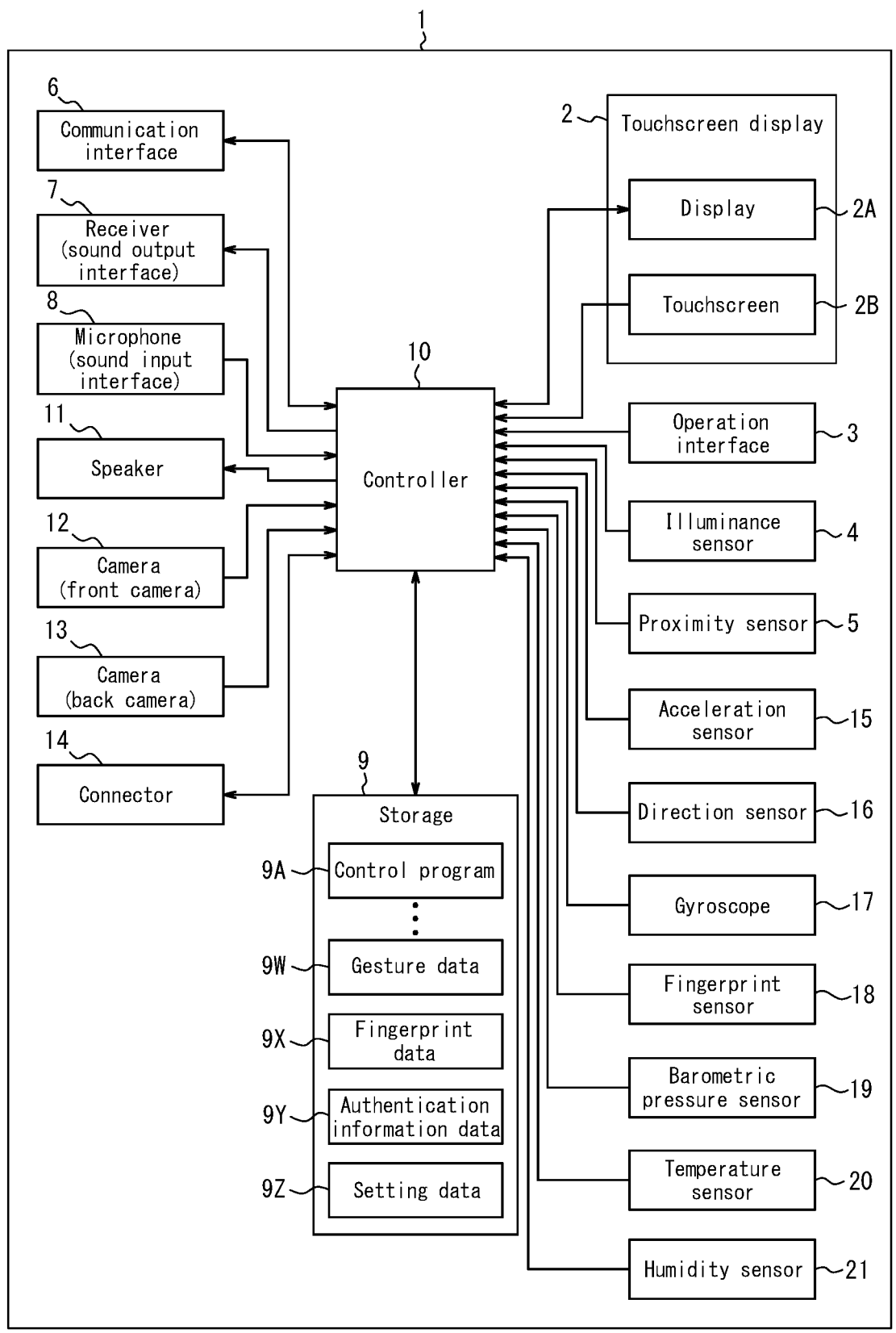
FIG. 4 is a functional block diagram illustrating an example of the configuration of the smartphone in FIG. 1.

FIG. 4 is a functional block diagram illustrating an example of the configuration of the smartphone 1. The smartphone 1 includes the touchscreen display 2, the operation interfaces 3, the illuminance sensor 4, the proximity sensor 5, a communication interface 6, the receiver 7, the microphone 8, a storage 9, the controller 10, the speaker 11, the cameras 12 and 13, the connector 14, an acceleration sensor 15, a direction sensor 16, a gyroscope 17, the fingerprint sensor 18, a barometric pressure sensor 19, a temperature sensor 20, and a humidity sensor 21.

As described above, the touchscreen display 2 includes a display 2A and a touchscreen 2B. The display 2A displays information such as letters, images, symbols, and graphics. The touchscreen 2B detects contact. The controller 10 detects a gesture on the smartphone 1. Specifically, the controller 10 cooperates with the touchscreen 2B to detect an operation (gesture) on the touchscreen 2B (touchscreen display 2).

The communication interface 6 communicates wirelessly. The communication method supported by the communication interface 6 is prescribed by a wireless communication standard. For example, a cellular phone communication standard such as 2G, 3G, or 4G may be used as the wireless communication standard. Examples of cellular phone communication standards include long term evolution (LTE), wideband code division multiple access (W-CDMA), CDMA2000, personal digital cellular (PDC), global system for mobile communications (GSM® (GSM is a registered trademark in Japan, other countries, or both)), and personal handy-phone system (PHS). Further examples of wireless communication standards include worldwide interoperability for microwave access (WiMAX), IEEE802.11, Bluetooth® (Bluetooth is a registered trademark in Japan, other countries, or both), infrared data association (IrDA), and near field communication (NFC). The communication interface 6 may support one or more of the aforementioned communication standards.

The barometric pressure sensor 19 can measure the barometric pressure acting on the smartphone 1.

The temperature sensor 20 can measure the temperature around the smartphone 1. The temperature sensor 20 may, for example, be a known sensor such as a thermocouple, a thermistor, bimetal, or the like.

The humidity sensor 21 can measure the humidity around the smartphone 1. The humidity sensor 21 may, for example, be an electric hygrometer that measures humidity using a sensor constituted by a semiconductor or the like. The humidity sensor 21 may, for example, be another type of hygrometer, such as a tension hygrometer, a wet/dry hygrometer, or a dew point hygrometer.

The storage 9 stores programs and data. The storage 9 may also be used as a working area to store results of processing by the controller 10 temporarily. The storage 9 may include any non-transitory storage medium, such as a semiconductor storage medium or a magnetic storage medium. The storage 9 may also include a plurality of types of storage media. The storage 9 may include a combination of a portable storage medium, such as a memory card, optical disc, or magneto-optical disc, and an apparatus for reading the storage medium. The storage 9 may include a storage device used as a temporary storage area, such as random access memory (RAM).

The programs stored on the storage 9 include applications that run in the foreground or the background and a control program that supports operations of the applications. The applications may, for example, display a screen on the display 2A and cause the controller 10 to execute processing in accordance with an input operation detected by the touchscreen 2B. The control program may, for example, be an operating system (OS). The applications and the control program may be installed on the storage 9 through wireless communication by the communication interface 6 or from a non-transitory storage medium.

The storage 9 stores a control program 9A, gesture data 9W, fingerprint data 9X, and setting data 9Z, for example. The gesture data 9W includes information related to gestures registered by the user who owns the smartphone 1. The fingerprint data 9X includes information related to fingerprints registered by the user who owns the smartphone 1. Authentication information data 9Y includes information related to authentication information registered by the user who owns the smartphone 1. The setting data 9Z includes information related to various settings for operation of the smartphone 1.

The control program 9A provides functions related to various types of control which enable the smartphone 1 to operate. The control program 9A may, for example, place a phone call by controlling components such as the communication interface 6, receiver 7, and microphone 8. The functions provided by the control program 9A include functions for performing various types of control, such as changing information displayed on the display 2A in accordance with input operations detected via the touchscreen 2B. The functions provided by the control program 9A may be used in combination with functions provided by other programs.

The control program 9A can provide a function to switch between the locked state and the unlocked state of the smartphone 1. Once the unlocked state is entered by virtue of the locked state being released, operations in respect of the touchscreen display 2, operation interfaces 3, and the like become possible, allowing the functions of the smartphone 1 to be used.

The control program 9A can provide a function to turn the proximity sensor 5 on. Details of the control to turn the proximity sensor 5 on are provided below.

The control program 9A provides a function for user authentication. The authentication function encompasses, for example, authentication based on the user's fingerprint, gesture-based authentication, and authentication based on input of authentication information.

Authentication by a fingerprint is for authenticating the user as a registered person when the fingerprint information scanned by the fingerprint sensor 18 matches preregistered fingerprint information within a predetermined range. Matching within a predetermined range refers, for example, to using image processing to evaluate the consistency between the scanned fingerprint image and a preregistered fingerprint image of the thumb and determining that the images match when the consistency is evaluated at a predetermined level or higher. Image processing includes, for example, processing to extract and compare feature points of a fingerprint. In the present disclosure, the determination that the fingerprint information scanned by the fingerprint sensor 18 matches the preregistered fingerprint information within a predetermined range is also referred to as "authentication being successful". In the present disclosure, the determination that the fingerprint information scanned by the fingerprint sensor 18 does not match the preregistered fingerprint information within a predetermined range is also referred to as "authentication failing".

Gesture-based authentication is for authenticating the user as a registered person when a user gesture detected by the proximity sensor 5 matches a preregistered gesture within a predetermined range. Matching within a predetermined range refers, for example, to evaluating the consistency between the detected gesture and the preregistered gesture and determining that the gestures match when the consistency is evaluated at a predetermined level or higher.

Authentication by input of authentication information is for authenticating the user as a registered person when an entered personal identification number (PIN), password, pattern, or the like matches a preregistered PIN, password, pattern, or the like. In the present disclosure, the authentication information refers to information that is input by the user with the touchscreen display 2 and used for authentication, such as a PIN, password, or pattern. However, the authentication information in the present disclosure does not include gestures or the user's fingerprints.

The control program 9A provides a function to authenticate the user on the basis of fingerprint information once the fingerprint information is output by the fingerprint sensor 18 during the locked state. For example, when the fingerprint information scanned by the fingerprint sensor 18 matches the preregistered fingerprint information within a predetermined range, the control program 9A determines that the user operating the smartphone 1 is a registered user and performs predetermined control in accordance with the determination result.

The fingerprint data 9X includes fingerprint information indicating an image of a fingerprint preregistered by the user. In the case of fingerprints of a plurality of fingers being registered, the fingerprint data 9X includes fingerprint information for each of the plurality of fingers. For example, in the case of fingerprints of the thumb and index finger being registered, the fingerprint data 9X includes two pieces of fingerprint information corresponding to the thumb and the index finger. In the fingerprint data 9X, fingerprint information is associated with information indicating the type of finger and hand. For example, in the case of the fingerprint of the thumb of the right hand being registered, information indicating the right hand and the thumb is associated with the fingerprint information in the fingerprint data 9X.

The authentication information data 9Y includes authentication information preregistered by the user. For example, the authentication information data 9Y includes information related to a PIN with a predetermined number of digits, a password consisting of a predetermined character sequence, or a predetermined pattern.

The gesture data 9W includes information on gestures preregistered by the user.

The controller 10 is an arithmetic processing unit. The arithmetic processing unit encompasses, for example, a central processing unit (CPU), a system-on-a-chip (SOC), a micro control unit (MCU), a field-programmable gate array (FPGA), and a coprocessor. However, the arithmetic processing unit is not limited to these examples. The controller 10 may include a plurality of arithmetic processing units. The controller 10 implements a variety of functions by comprehensively controlling operations of the smartphone 1.

In greater detail, the controller 10 executes commands included in the programs stored in the storage 9 while referring as necessary to data stored in the storage 9. The controller 10 thus controls functional components in accordance with data and instructions, thereby implementing various functions. The functional components include, but are not limited to, the display 2A, communication interface 6, receiver 7, and speaker 11, for example. The controller 10 may change the control in response to detection results from detectors. The detectors include, but are not limited to, the touchscreen 2B, operation interfaces 3, illuminance sensor 4, proximity sensor 5, microphone 8, camera 12, camera 13, acceleration sensor 15, direction sensor 16, gyroscope 17, fingerprint sensor 18, barometric pressure sensor 19, temperature sensor 20, and humidity sensor 21, for example.

The controller 10 turns the proximity sensor 5 on when it is judged that a predetermined condition is satisfied. In other words, the controller 10 activates the proximity sensor 5 to enter a state enabling gesture-based input operations when it is judged that a predetermined condition is satisfied. Details of the predetermined condition and the processing by the controller 10 are provided below.

The acceleration sensor 15 detects the magnitude and direction of acceleration acting on the smartphone 1, the angle of inclination of the smartphone 1, and the magnitude and direction of gravitational acceleration. The direction sensor 16 detects the orientation of the earth's magnetic field. The gyroscope 17 detects the angle and the angular velocity of the smartphone 1. The detection results of the acceleration sensor 15, direction sensor 16, and gyroscope 17 are used in combination to detect changes in the position, orientation, and state of the smartphone 1.

A portion or all of the programs and data stored in the storage 9 in FIG. 4 may be downloaded by the communication interface 6 from another apparatus by wireless communication. A portion or all of the programs and data stored in the storage 9 in FIG. 4 may also be stored in a non-transitory storage medium that is readable by a reading apparatus included in the storage 9. A portion or all of the programs and data stored in the storage 9 in FIG. 4 may also be stored in a non-transitory storage medium that is readable by a reading apparatus that connects to the connector 14. Non-limiting examples of the non-transitory storage medium include optical discs such as a compact disc (CD®), digital versatile disc (DVD®), and Blu-ray® (CD, DVD, and Blu-ray are registered trademarks in Japan, other countries, or both), magneto-optical discs, magnetic storage media, memory cards, and solid-state storage media.

The configuration of the smartphone 1 illustrated in FIG. 1 through FIG. 4 is only an example and may be changed as necessary without departing from the scope of the present disclosure. For example, the number and type of operation interfaces 3 are not limited to the example in FIG. 1 through FIG. 4. Instead of the operation interfaces 3A to 3C, the smartphone 1 may include buttons arranged as a numeric keypad, a QWERTY keyboard, or another arrangement as buttons for operations related to the screen. The smartphone 1 may also include only one operation interface for operations related to the screen. The smartphone 1 includes two cameras 12 and 13 in the example illustrated in FIG. 4, but the smartphone 1 may include just one camera or may lack the cameras 12 and 13 altogether. The smartphone 1 includes four types of sensors for detecting position and orientation in the example illustrated in FIG. 4, but the smartphone 1 need not include all of these sensors. The smartphone 1 may also include another type of sensor for detecting at least one of position and orientation.

Outline of Control Executed by Controller

Figure 5:
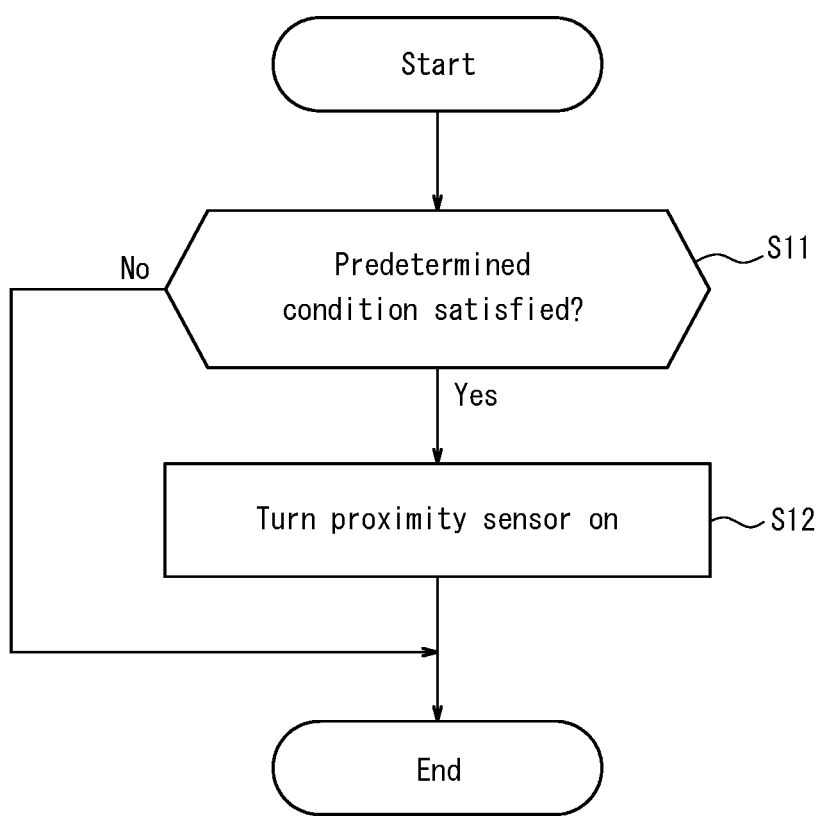
FIG. 5 is a flowchart illustrating an example of a processing procedure, executed by the controller of FIG. 4, to activate a proximity sensor.

Next, the control executed by the controller 10 to activate the proximity sensor 5 is described in detail. FIG. 5 is a flowchart illustrating an example of a processing procedure, executed by the controller 10, to activate the proximity sensor 5. At the point when the process in FIG. 5 begins, the proximity sensor 5 is in a non-activated state, i.e. off.

The controller 10 judges whether a predetermined condition is satisfied (step S11). The predetermined condition can be set appropriately, and details are provided below. The predetermined condition may be a condition not depending on user input.

The controller 10 terminates this process while maintaining the proximity sensor 5 off when it is judged that the predetermined condition is not satisfied (step S11: No).

Conversely, the controller 10 turns the proximity sensor 5 (step S12) on when it is judged that the predetermined condition is satisfied (step S11: Yes). Gesture detection by the proximity sensor 5 thus begins. In other words, the user can perform an input operation on the smartphone 1 using a gesture.

In this way, the proximity sensor 5 is turned on when a predetermined condition not depending on user input is satisfied. In accordance with circumstances and without requiring specific user input, the smartphone 1 can thus automatically enter a state enabling gesture detection.

Control by the controller 10 and a specific example of the predetermined condition are described below.

First Embodiment

The predetermined condition may, for example, be a condition allowing judgment that the smartphone 1 is wet. The controller 10 judges whether the smartphone 1 is wet with a liquid such as water. When it is judged that the smartphone 1 is wet, the controller 10 may turn the proximity sensor 5 on and start gesture detection. In the present disclosure, the smartphone 1 being wet encompasses a state in which liquid, such as a drop of water, is present on the surface of the smartphone 1 and a state in which the smartphone 1 is immersed in a liquid such as water.

The controller 10 acquires information for judging whether the smartphone 1 is wet from the touchscreen 2B, fingerprint sensor 18, or barometric pressure sensor 19, for example, and judges whether the smartphone 1 is wet on the basis of the information.

The barometric pressure sensor 19 can measure information for judging whether the smartphone 1 is wet. The barometric pressure sensor 19 measures a change in barometric pressure as the information for judging whether the smartphone 1 is wet. For example, water pressure acts on the smartphone 1 when the smartphone 1 is immersed in water. The barometric pressure sensor 19 can measure the change in water pressure acting on the smartphone 1. On the basis of this change in water pressure, it is judged whether the smartphone 1 is wet.

The touchscreen 2B can measure information for judging whether the smartphone 1 is wet. For example, when a capacitive system is used as the detection system, the touchscreen 2B measures a change in capacitance as the information for judging whether the smartphone 1 is wet. The touchscreen 2B repeats the process of applying a predetermined signal to each sensor electrode among a plurality of sensor electrodes arranged in a grid on the touchscreen 2B and reading the output value from each sensor electrode. In this way, the touchscreen 2B can measure the change in capacitance at a detection point on the touchscreen 2B. The sensor electrode is one example of the detection point. The sensor electrode functions as a touch sensor.

The touchscreen 2B can adopt a system other than a capacitive system as the detection system. When a resistive film system or a load detection system is adopted as another detection system, the touchscreen 2B may, for example, detect a change in magnitude of voltage as the information for judging whether the smartphone 1 is wet. When a surface acoustic wave system is adopted as another detection system, the touchscreen 2B may, for example, detect attenuation of a surface acoustic wave emitted by the smartphone 1 as the information for judging whether the smartphone 1 is wet. When an infrared system is adopted as another detection system, the touchscreen 2B may, for example, detect attenuation of an infrared light beam emitted by the smartphone 1 as the information for judging whether the smartphone 1 is wet.

In the present embodiment, an example of the detection system of the touchscreen 2B being a capacitive system is described. If a liquid touches the touchscreen 2B, the output value of the touchscreen 2B changes. Therefore, it is judged whether the smartphone 1 is wet on the basis of the change.

The fingerprint sensor 18 can measure information for judging whether the smartphone 1 is wet. For example, when the fingerprint sensor 18 is a semiconductor capacitive sensor, then like the touchscreen 2B, the fingerprint sensor 18 measures a change in capacitance as the information for judging whether the smartphone 1 is wet. If a liquid touches the fingerprint sensor 18, the output value of the fingerprint sensor 18 changes. Therefore, it is judged whether the smartphone 1 is wet on the basis of the change.

Figure 6:
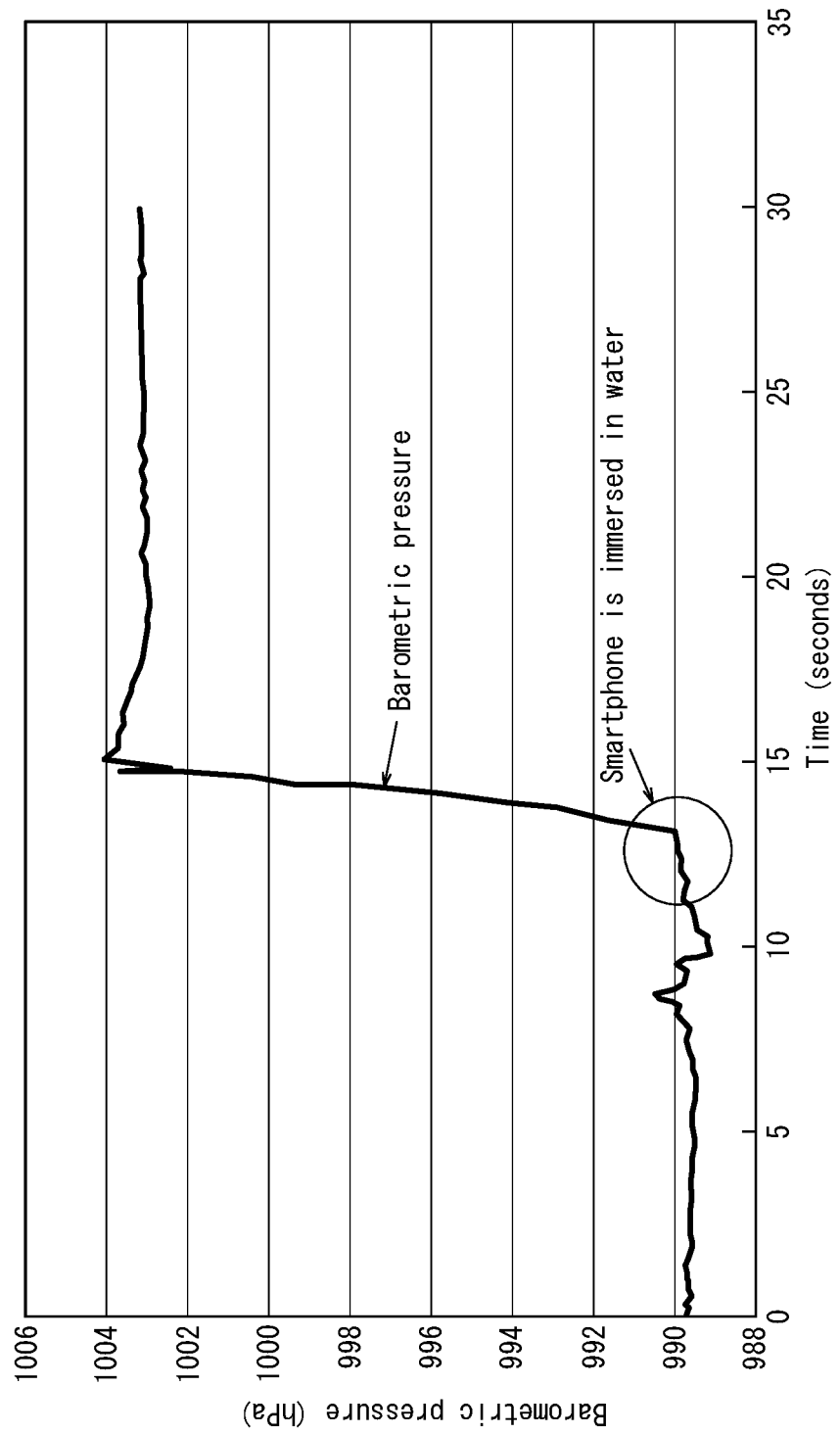
FIG. 6 illustrates an example of barometric pressure change measured by the barometric pressure sensor of FIG. 4.

The controller 10 implements the process to judge whether the smartphone 1 is wet by executing the control program 9A. For example, the controller 10 judges that the smartphone 1 is immersed in liquid and is wet when the barometric pressure measured by the barometric pressure sensor 19 satisfies a condition. FIG. 6 illustrates an example of barometric pressure change measured by the barometric pressure sensor 19. As illustrated in FIG. 6, the barometric pressure measured by the barometric pressure sensor 19 exhibits a sudden increase of 10 hectopascals or more over several seconds when the smartphone 1 is immersed in water. For example, an advance definition of the change in barometric pressure per unit time (slope) when the smartphone 1 is immersed in water enables the controller 10 to judge whether the smartphone 1 is immersed in water. In other words, the controller 10 can judge whether the smartphone 1 is immersed in liquid by comparing the barometric pressure change defined in advance with the barometric pressure change calculated from the barometric pressure measured by the barometric pressure sensor 19. The controller 10 may infer that the smartphone 1 is immersed in liquid when, for example, the barometric pressure change defined in advance and the barometric pressure change calculated from the value measured by the barometric pressure sensor 19 match with a predetermined accuracy.

Figure 7:
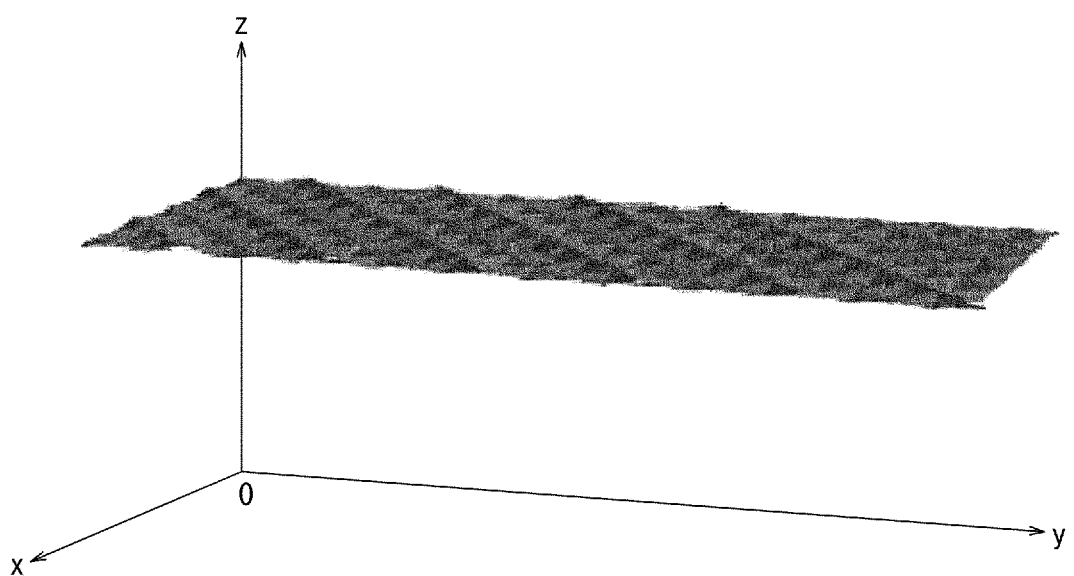
FIG. 7 illustrates an example of capacitance measured by the touchscreen of FIG. 4.
Figure 8:
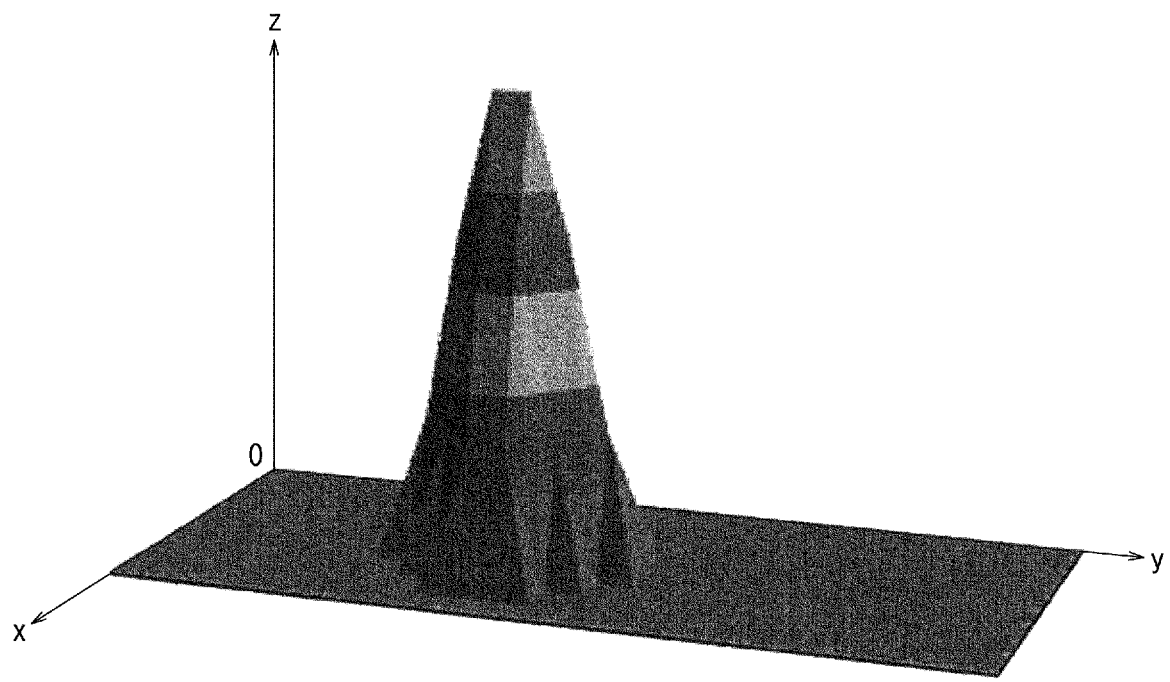
FIG. 8 illustrates another example of capacitance measured by the touchscreen of FIG. 4.

The controller 10 judges that the smartphone 1 is wet when, for example, the capacitance measured by the touchscreen 2B satisfies a condition. For example, when the area of a region where the capacitance measured by the touchscreen 2B exceeds a predetermined value is a predetermined area or greater, the controller 10 judges that liquid is present on the touchscreen 2B of the smartphone 1 and that the smartphone 1 is wet. The predetermined value is a value enabling judgment of the capacitance in the region where liquid is present. FIG. 7 and FIG. 8 illustrate examples of capacitance measured by the touchscreen 2B. FIG. 7 illustrates an example of capacitance when the smartphone 1 is immersed in water, and FIG. 8 illustrates an example of capacitance when the user has touched a finger to the touchscreen 2B. In FIG. 7 and FIG. 8, the xy-plane represents the plane coordinates of the touchscreen 2B, and the z-direction represents the capacitance. When the smartphone 1 is immersed in water, the capacitance measured by the touchscreen 2B exhibits a uniform distribution exceeding a predetermined value over the entire region of the touchscreen 2B, as illustrated in FIG. 7. By contrast, when a finger is touching the touchscreen 2B, the capacitance measured by the touchscreen 2B exhibits a distribution in which the capacitance spikes in the region touched by the finger, as illustrated in FIG. 8. When a finger is touching the touchscreen 2B, the capacitance in the region touched by the finger exceeds the predetermined value, but the capacitance in other regions is less than the predetermined value. The controller 10 judges that the smartphone 1 is wet when the area of the region where the capacitance measured by the touchscreen 2B exceeds the predetermined value is greater than the area of a region exceeding the predetermined value when a finger is touching. As illustrated in FIG. 7, when the entire touchscreen 2B is wet, the capacitance exceeds the predetermined value over the entire region. FIG. 7 illustrates an example of the entire touchscreen 2B being wet, but when a water drop is present on a portion of the touchscreen 2B, for example, the capacitance exceeds the predetermined value in the region where the water drop is present. When the area of the region where the capacitance exceeds the predetermined value is equal to or greater than a predetermined area, the controller can judge that a finger is not touching the touchscreen 2B, but rather that the smartphone 1 is wet from a water drop or the like.

Figure 9:
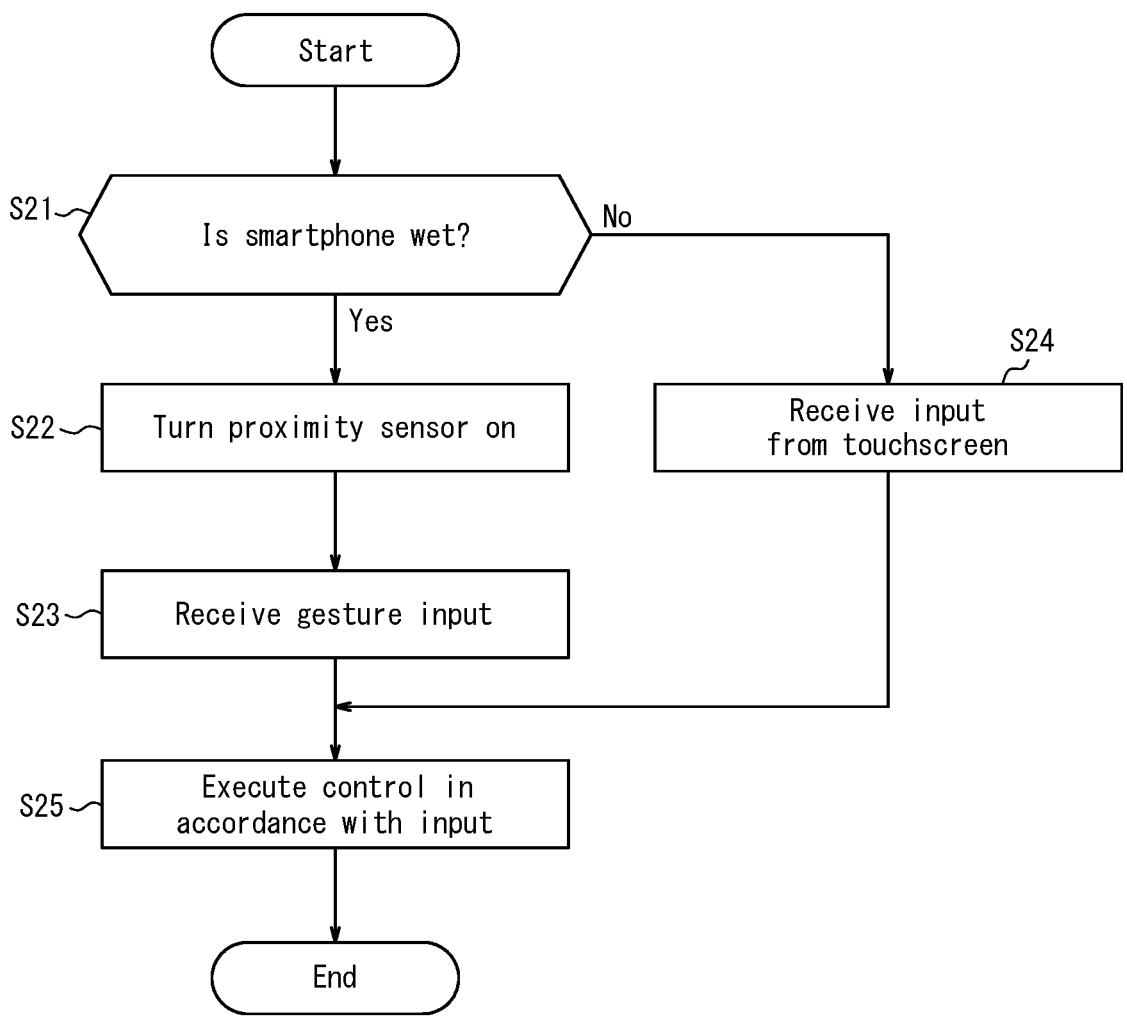
FIG. 9 is a flowchart illustrating an example of a processing procedure executed by the controller of FIG. 4.

FIG. 9 is a flowchart illustrating an example of a processing procedure executed by the controller 10. The controller 10 may execute the process in FIG. 9 periodically, for example. At the start of the process in FIG. 9, the smartphone 1 is assumed not to be wet, and the proximity sensor 5 is assumed to be off.

The controller 10 judges whether the smartphone 1 is wet by whether a predetermined condition is satisfied (step S21). The controller 10 acquires information for judging whether the smartphone 1 is wet from the touchscreen 2B, fingerprint sensor 18, or barometric pressure sensor 19, for example, and judges whether the smartphone 1 is wet on the basis of the information.

When it is judged that the smartphone 1 is wet (step S21: Yes), the controller 10 turns the proximity sensor 5 on (step S22). Gesture detection by the proximity sensor 5 thus begins. For example, after turning the proximity sensor 5 on, the controller 10 may maintain the proximity sensor 5 on for a predetermined time period (such as 5 or 10 minutes). The predetermined time period may be set appropriately to the length of time the smartphone 1 is assumed to remain wet.

When the user performs a gesture in front of the smartphone 1, the controller 10 receives input of the gesture by using the proximity sensor 5 to identify the gesture performed by the user (step S23).

The controller 10 executes control corresponding to the input received from the proximity sensor 5 (step S25). For example, the controller 10 can scroll the screen in accordance with the input received from the proximity sensor 5.

Figure 10:
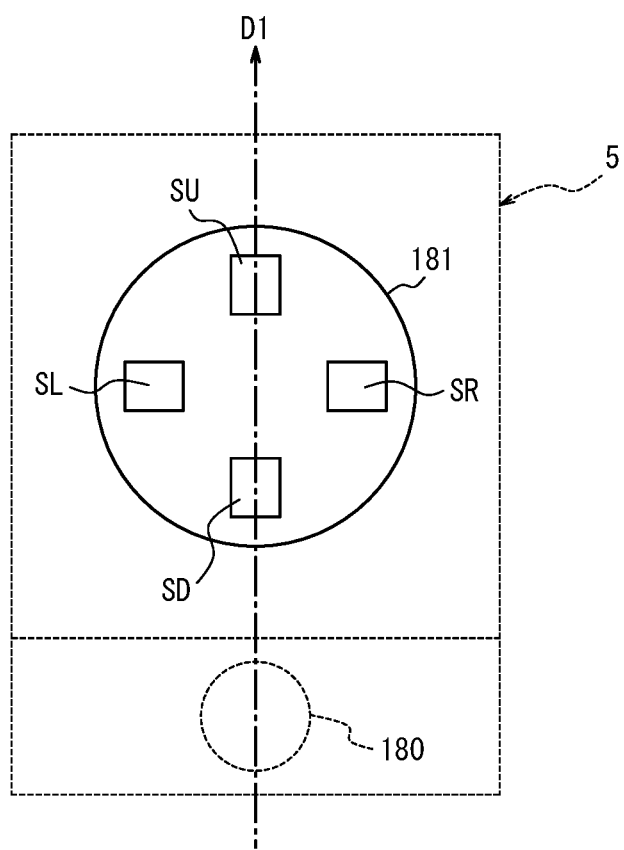
FIG. 10 is a configuration diagram of the proximity sensor.

A method performed by the controller 10 to detect a gesture by the user on the basis of output of the proximity sensor 5 is described below in detail with reference to FIGS. 10 and 11. FIG. 10 illustrates an example configuration of the proximity sensor 5 when the smartphone 1 is viewed from the front. The proximity sensor 5 includes an infrared LED 180 acting as a light source and four infrared photodiodes SU, SR, SD, and SL. The four infrared photodiodes SU, SR, SD, and SL detect reflected light from a detection target through a lens 181. The four infrared photodiodes SU, SR, SD, and SL are arranged symmetrically around the center of the lens 181. The imaginary line D1 illustrated in FIG. 10 is roughly parallel to the longitudinal direction of the smartphone 1. The infrared photodiode SU and the infrared photodiode SD are placed apart on the imaginary line D1 in FIG. 10. The infrared photodiodes SR and SL are placed between the infrared photodiode SU and the infrared photodiode SD in the direction of the imaginary line D1 in FIG. 10.

Figure 11:
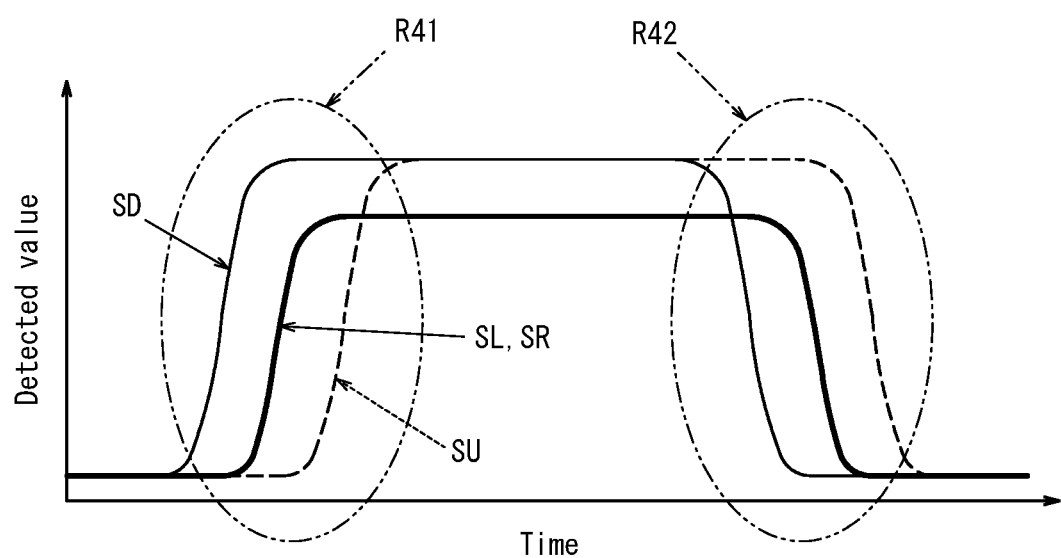
FIG. 11 illustrates the change over time in the value detected by each infrared photodiode.

FIG. 11 illustrates the change over time in the value detected by the four infrared photodiodes SU, SR, SD, and SL as the detection target (for example, the user's hand) moves in the direction of the imaginary line D1 in FIG. 10. The infrared photodiode SU and the infrared photodiode SD are separated the most in the direction of the imaginary line D1. Hence, as illustrated in FIG. 11, the time difference is greatest between the change (for example, increase) in the value detected by the infrared photodiode SU (dashed line) and the same change (for example, increase) in the value detected by the infrared photodiode SD (thin, solid line). By recognizing a time difference in a predetermined change in the value detected by the infrared photodiodes SU, SR, SD, and SL, the controller 10 can judge the movement direction of the detection target.

The controller 10 acquires the value detected by the infrared photodiodes SU, SR, SD, and SL from the proximity sensor 5. To recognize movement by the detection target in the direction of the imaginary line D1, for example, the controller 10 may integrate the result of subtracting the value detected by the photodiode SU from the value detected by the photodiode SD over a predetermined time. In the example in FIG. 11, the integral value in regions R41 and R42 is non-zero. From the change in the integral value (for example, a positive, zero, or negative change), the controller 10 can recognize movement of the detection target in the direction of the imaginary line D1.

The controller 10 may also integrate the result of subtracting the value detected by the photodiode SR from the value detected by the photodiode SL over a predetermined time. From the change in the integral value (for example, a positive, zero, or negative change), the controller 10 can recognize movement of the detection target in a direction orthogonal to the imaginary line D1 (a direction substantially parallel to the transverse direction of the smartphone 1).

Alternatively, the controller 10 may perform calculations using all of the detected values of the photodiodes SU, SR, SD, and SL. In other words, the controller 10 may recognize the movement direction of the detection target without dividing the movement direction into components in the longitudinal direction and the transverse direction of the smartphone 1 and performing calculations.

The detected gesture may be a left or right gesture, an up or down gesture, a diagonal gesture, a gesture to trace a circle clockwise, a gesture to trace a circle counterclockwise, or other such gesture. For example, the left or right gesture is performed in a direction substantially parallel to the transverse direction of the smartphone 1. The up or down gesture is performed in a direction substantially parallel to the longitudinal direction of the smartphone 1. The diagonal gesture is performed in a plane substantially parallel to the smartphone 1 in a direction not parallel to either the longitudinal direction or the transverse direction of the smartphone 1.

On the other hand, when it is judged that the smartphone 1 is not wet in step S21 of FIG. 9 (step S21: No), the controller 10 maintains the proximity sensor 5 off. In this case, the controller 10 receives input from the touchscreen display 2 when the user provides operation input to the touchscreen display 2 (step S24).

The controller 10 executes control in accordance with the input received from the touchscreen display 2 (step S25).

For example, the controller 10 can launch an application in response to input received from the touchscreen display 2.

In this way, the controller 10 can turn the proximity sensor 5 on automatically and receive gesture-based input operations when it is judged that the smartphone 1 is wet. When the smartphone 1 is wet, the user can therefore execute touchless control with a gesture without first executing a special operation on the smartphone 1. The smartphone 1 according to the present embodiment thus has improved convenience.

The process described with reference to FIG. 9 may, for example, be executed when the smartphone 1 is in a particular mode. The smartphone 1 has a plurality of modes, for example. Modes refer to operation modes (operation states or operation statuses) that, for example, place restrictions on the overall operations of the smartphone 1. For example, when a particular application is launched, the smartphone 1 enters an operation mode corresponding to the application. A configuration allowing selection of only one mode at a time may be adopted. In the present embodiment, the modes of the smartphone 1 include a first mode and a second mode.

The first mode is a regular operation mode (regular mode) appropriate for use in rooms other than the kitchen or outside of the home, for example. In the first mode, the user can access functions executable by the smartphone 1. The user can access a camera function, a calling function, an e-mail function, and the like of the smartphone 1 in the first mode, for example. In the first mode, the user can also launch an application installed on the smartphone 1.

Figure 12:
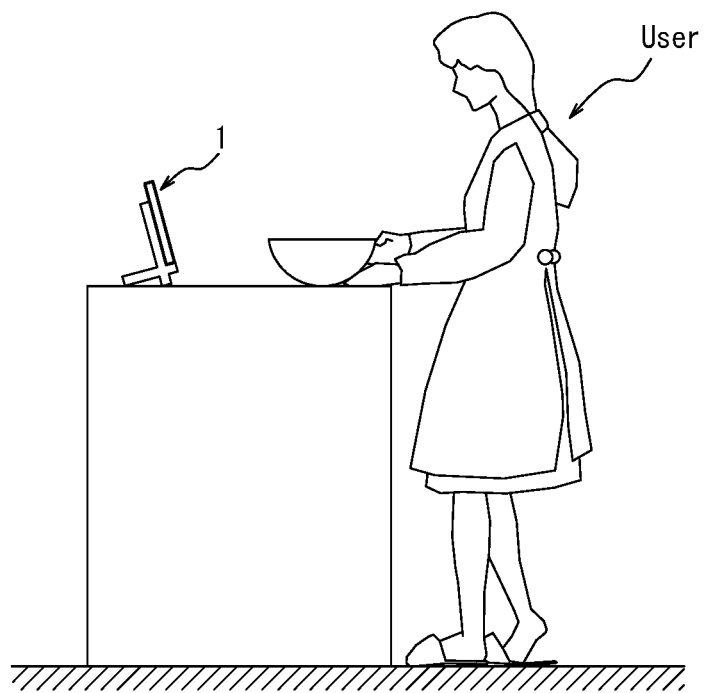
FIG. 12 illustrates an example of the user using the smartphone in a second mode.

The second mode is an operation mode (kitchen mode) optimal for cooking in the kitchen while a recipe is displayed. The user can, for example, switch the smartphone 1 to the second mode by launching a particular application. The particular application referred to here may, for example, be an application to display a recipe. FIG. 12 illustrates an example of the user using the smartphone 1 in the second mode. In the example in FIG. 12, the user is cooking in the kitchen by following a recipe displayed on the display 2A of the smartphone 1. At this time, the controller 10 may execute the process in the flowchart of FIG. 9. When the smartphone 1 is used in the kitchen, for example, water or the like might splash on the smartphone 1. Water drops or the like might also stick to the smartphone 1 if the user operates the smartphone 1 with a wet hand. In such cases, the controller 10 automatically turns the proximity sensor 5 on and receives gesture-based input operations. The smartphone 1 can thus receive an operation in which the user touches the touchscreen 2B with a finger and can receive a gesture-based operation. Therefore, instead of operating the smartphone 1 by touching the smartphone 1 with a hand, the user can operate the smartphone 1 by gesture.

Second Embodiment

The control by the controller 10 for turning the proximity sensor 5 on may be adapted to control for releasing the locked state. An example of adapting the control for turning the proximity sensor 5 on to control for releasing the locked state is described as the second embodiment. In the second embodiment, the predetermined condition is assumed to be a condition allowing judgment that the smartphone 1 is wet, as in the first embodiment.

Figure 13:
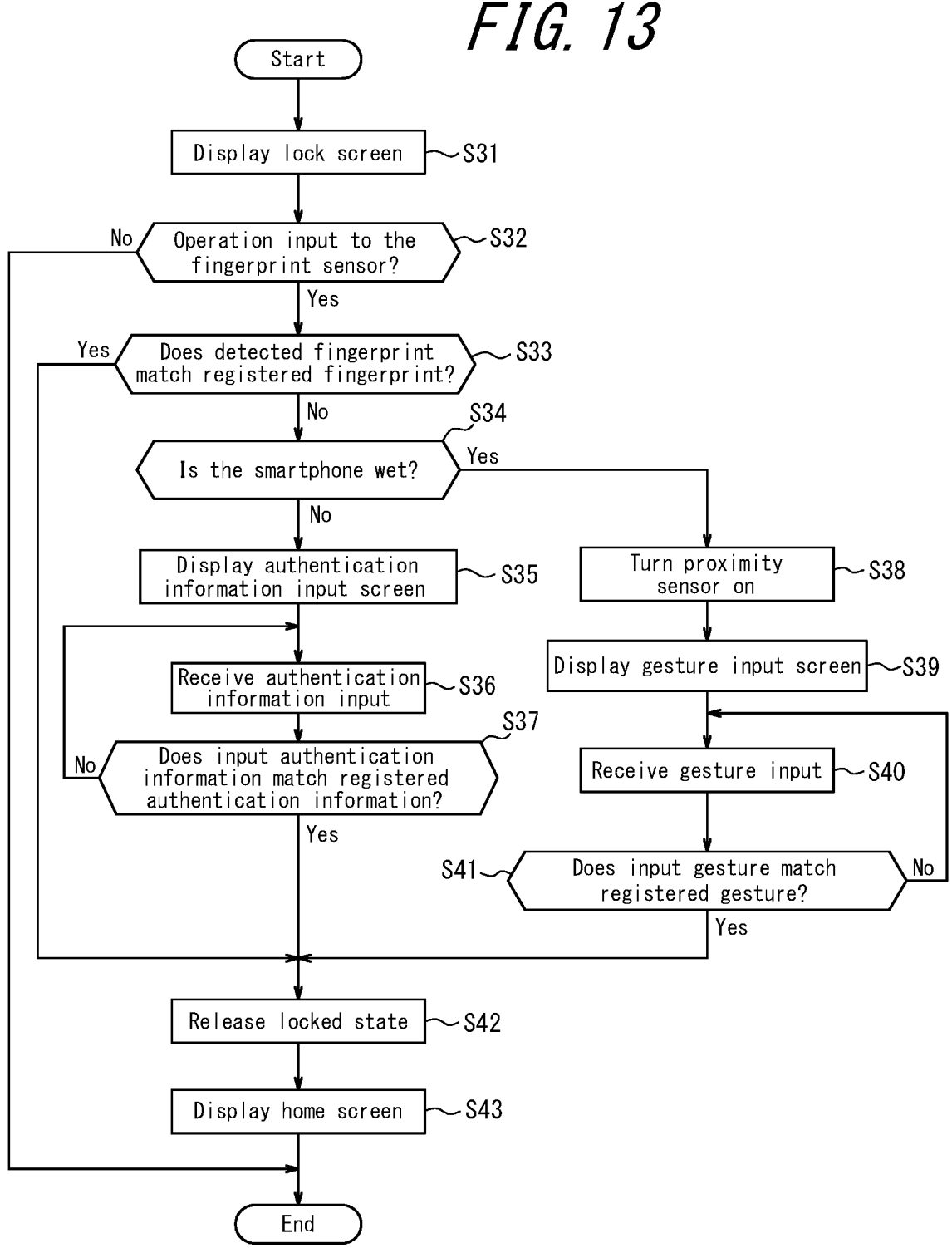
FIG. 13 is a flowchart illustrating an example of a processing procedure executed by the controller of FIG. 4.

FIG. 13 is a flowchart illustrating an example of a processing procedure, executed by the controller 10, to release the locked state. FIG. 13 may, for example, be executed when the operation interface 3 of the smartphone 1 is operated. For example, the controller 10 starts the flowchart in FIG. 13 when detecting that the operation interface 3 has been operated during a state in which no screen is displayed on the display 2A. Here, at the point when the process in FIG. 13 begins, the proximity sensor 5 is off, i.e. in a non-activated state.

Figure 14:
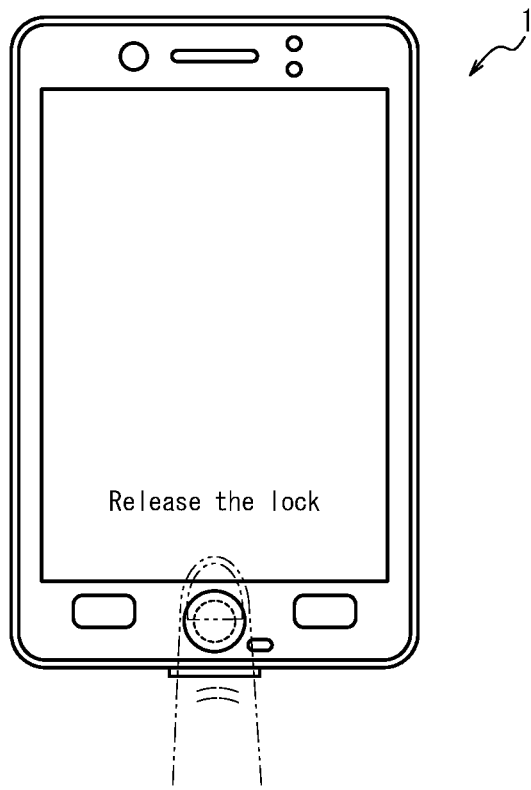
FIG. 14 illustrates an example lock screen displayed on the display.

When the operation interface 3 of the smartphone 1 is operated, the controller 10 displays the lock screen on the display 2A (step S31). For example, a lock screen such as the one in FIG. 14 is displayed on the display 2A. Information prompting the user to release the lock, such as "Release the lock", is included in the lock screen.

The controller 10 judges whether an operation to release the locked state has been input to the fingerprint sensor 18 (step S32). When the user has placed a finger on the fingerprint sensor 18 while the lock screen is displayed, for example as indicated by the dashed double-dotted lines in FIG. 14, then the controller 10 can judge that an operation to release the locked state has been input to the fingerprint sensor 18 on the basis of the output from the fingerprint sensor 18. In this case, the fingerprint sensor 18 transmits information related to a scanned image of a fingerprint to the controller 10. On the other hand, when the user has not placed a finger on the fingerprint sensor 18 while the lock screen is displayed, then the controller 10 can judge that an operation to release the locked state has not been input to the fingerprint sensor 18.

When it is judged that an operation to release the locked state has not been input to the fingerprint sensor 18 (step S32: No), the controller 10 terminates this process without releasing the locked state. When it is judged that an operation to release the locked state has not been input to the fingerprint sensor 18 even though a predetermined time period (such as several seconds) has elapsed since the lock screen was displayed, the controller 10 may turn off the display of the lock screen by the display 2A.

When it is judged that an operation to release the locked state has been input to the fingerprint sensor 18 (step S32: Yes), the controller 10 judges whether the fingerprint detected by the fingerprint sensor 18 matches a fingerprint registered in advance in the storage 9 as fingerprint data 9X (step S33).

Figure 15:
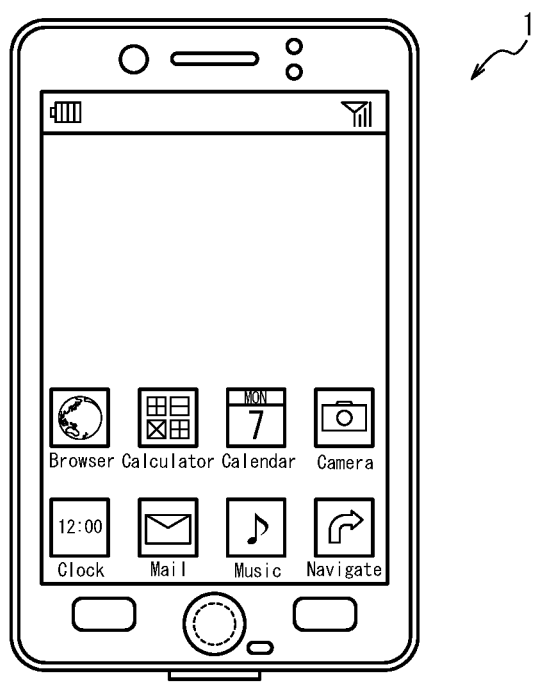
FIG. 15 illustrates an example home screen displayed on the display.

When it is judged that the fingerprint detected by the fingerprint sensor 18 matches a fingerprint registered in the storage 9 (step S33: Yes), the controller 10 releases the locked state of the smartphone 1 (step S42). In this case, the controller 10 displays the home screen, such as the one in FIG. 15, on the display 2A (step S43). The user can thus use all of the functions on the smartphone 1.

Conversely, when it is judged that the fingerprint detected by the fingerprint sensor 18 does not match a fingerprint registered in the storage 9 (step S33: No), the controller 10 judges whether the smartphone 1 is wet, without releasing the locked state (step S34). The controller 10 acquires information for judging whether the smartphone 1 is wet from the touchscreen 2B, fingerprint sensor 18, or barometric pressure sensor 19, for example, and judges whether the smartphone 1 is wet on the basis of the information.

Figure 16:
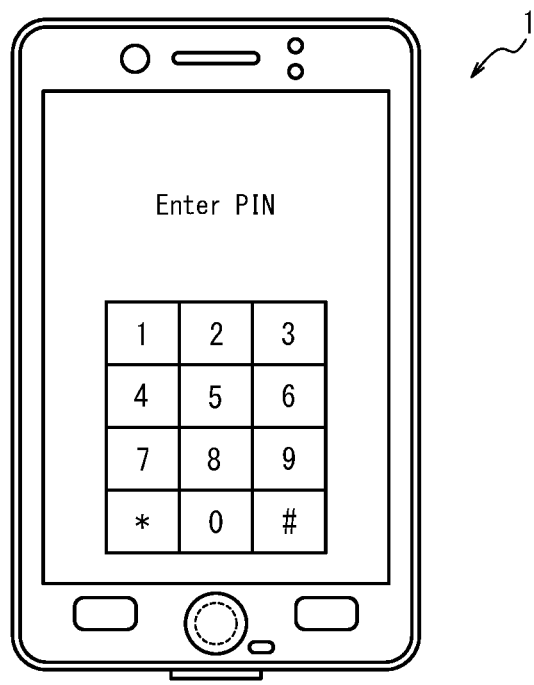
FIG. 16 illustrates an example authentication information input screen displayed on the display.

When it is judged that the smartphone 1 is not wet (step S34: No), the controller 10 executes a lock release algorithm for the case of the smartphone 1 not being wet. Specifically, the controller 10 displays an authentication information input screen on the display 2A (step S35). The authentication information input screen is a screen for receiving input of authentication information. When the authentication information is a PIN, this screen includes the display of a numeric keypad, for example as illustrated in FIG. 16. Depending on the method of the fingerprint sensor 18, it may not be possible to acquire a clear fingerprint image for reasons such as the state of the user's finger. In this case, even repeated fingerprint authentication might fail. The user may find repeated authentication failure to be troublesome. When fingerprint authentication fails, the authentication information input screen can therefore be displayed for authentication by authentication information.

When the user inputs authentication information on the touchscreen display 2, the controller 10 receives the user input of authentication information (step S36).

The controller 10 judges whether the authentication information received in step S36 matches the authentication information registered in advance in the storage 9 as authentication information data 9Y (step S37).

When it is judged that the received authentication information does not match the authentication information registered in the storage 9 as authentication information data 9Y (step S37: No), the controller 10 returns to step S36 and again receives input of authentication information. When, for example, it is judged that the received authentication information does not match the authentication information registered in the storage 9 despite performance of authentication by authentication information a predetermined number of times (such as five), the controller 10 may terminate this process without releasing the locked state.

Conversely, when it is judged that the received authentication information matches the authentication information registered in the storage 9 (step S37: Yes), the controller 10 releases the locked state of the smartphone 1 (step S42). The controller 10 then displays the home screen on the display 2A (step S43). The user can thus use all of the functions on the smartphone 1.

In this way, when fingerprint authentication fails while the smartphone 1 is not wet, authentication by authentication information is performed. When authentication is successful, the smartphone 1 enters a state enabling use of all functions.

When it is judged in step S34 that the smartphone 1 is wet (step S34: Yes), the controller 10 executes a lock release algorithm for the case of the smartphone 1 being wet. Specifically, the controller 10 turns the proximity sensor 5 on (step S38). Gesture detection by the proximity sensor 5 thus begins.

Figure 17:
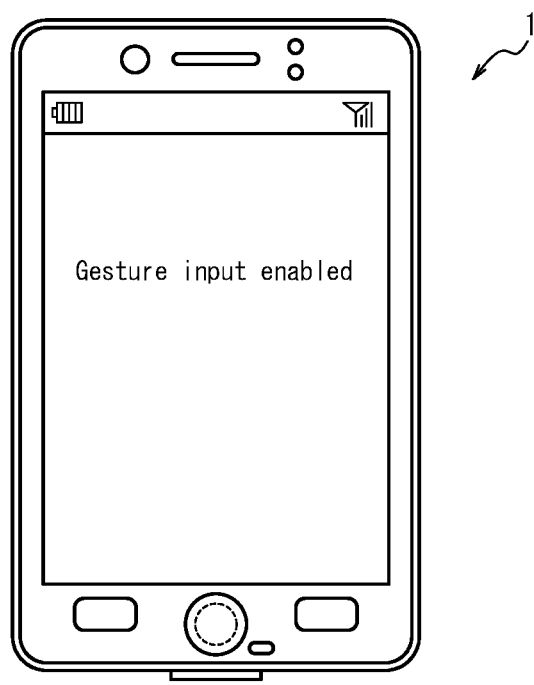
FIG. 17 illustrates an example gesture input screen displayed on the display.

The controller 10 displays a gesture input screen on the display 2A (step S39). The gesture input screen is a screen for notifying the user of receipt of gesture input. For example, as illustrated in FIG. 17, this screen includes a display notifying the user that gesture input can be received. When the smartphone 1 is wet, such as when a water drop is present on the fingerprint sensor 18, the fingerprint sensor 18 might not be able to acquire a fingerprint image. Furthermore, when the smartphone 1 is wet, the user might not want to touch and operate the touchscreen display 2 with a finger. Therefore, when fingerprint authentication fails, gesture-based authentication can be executed as in the present embodiment, without fingerprint authentication or authentication by authentication information.

When the user performs a gesture in front of the smartphone 1, the controller 10 receives input of the gesture by using the proximity sensor 5 to identify the gesture performed by the user (step S40).

Figure 18:
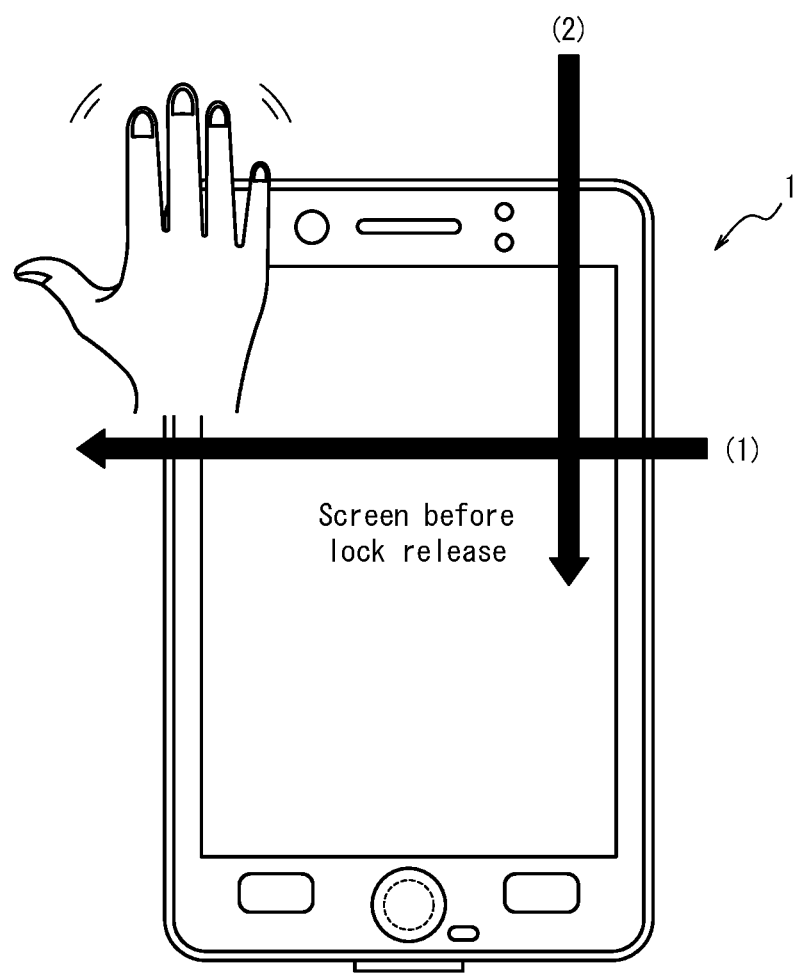
FIG. 18 schematically illustrates an example of a gesture used during gesture-based authentication.

The user can register a gesture consisting of any combination of gestures in the gesture data 9W as the gesture used for gesture-based authentication. For example, the user can register a sequence of gestures consisting of a gesture from right to left followed by a downward gesture, as in the example in FIG. 18, in the gesture data 9W as the gesture to use for gesture-based authentication.

When it is judged that the gesture received in step S40 of FIG. 13 does not match the gesture registered in the storage 9 (step S41: No), the controller 10 returns to step S40 and again receives gesture input. When, for example, it is judged that the received gesture does not match the gesture registered in the storage 9 despite performance of gesture-based authentication a predetermined number of times (such as five), the controller 10 may terminate this process without releasing the locked state.

Conversely, when it is judged that the received gesture matches the gesture registered in the storage 9 as gesture data 9W (step S41: Yes), the controller 10 releases the locked state of the smartphone 1 (step S42). The controller 10 then displays the home screen on the display 2A (step S43). The user can thus use all of the functions on the smartphone 1.

In this way, when fingerprint authentication fails while the smartphone 1 is wet, the controller 10 turns the proximity sensor 5 on and executes gesture-based authentication. When the smartphone 1 is wet, the user can therefore execute touchless control with a gesture without first executing a special operation on the smartphone 1. The smartphone 1 according to the present embodiment thus has improved convenience.

For example, it is assumed that a water drop may be present on the smartphone 1 due to the user touching the smartphone 1 with a wet hand. In this case, the controller 10 turns the proximity sensor 5 on and enters a state enabling receipt of gesture-based input. At this time, the user can also perform operations by touching the touchscreen 2B with the wet hand. When the touchscreen 2B is touched by the hand, however, a water drop on the hand sticks to the touchscreen 2B. When the user performs an operation for displaying information such as images or characters on the display 2A, for example, this water drop may make it difficult to see the displayed information. However, the touchscreen 2B is not touched by the hand if the user provides gesture-based input, and a water drop on the hand does not stick to the touchscreen 2B. The smartphone 1 thus maintains visibility of information on the display 2A.

When the locked state is released by a gesture, the controller 10 may restrict a portion of the functions executable by the user. For example, when the locked state is released by a gesture, the controller 10 may disallow execution of functions involving personal information and functions involving a money transfer. In other words, when the locked state is released by a gesture, the controller 10 need not execute functions involving personal information and functions involving a money transfer even if user input for these functions is received. Functions involving personal information are, for example, functions that use personal information during execution, such as a function to send or receive e-mail. Functions involving a money transfer are, for example, functions that could initiate a money transfer during execution, such as online shopping. In this case, the user executes functions involving personal information and functions involving a money transfer, for example, after releasing the locked state using authentication information.

Furthermore, when the locked state is released by a gesture, the controller 10 may receive a predetermined operation in response to a gesture-based input operation. In other words, when the locked state is released by a gesture, the user might wish to continue performing operations without touching the touchscreen 2B. When the locked state is released by a gesture, the controller 10 may therefore perform several functions in response to gesture-based input operations. The functions performable in response to gesture-based input operations may, for example, be set by the user in advance. The functions performable in response to gesture-based input operation may, for example, be frequently used functions (i.e. used more frequently than other functions). The controller 10 may, for example, execute an e-mail viewing function in response to a gesture to move the hand left or right when the locked state has been released by a gesture. The controller 10 may, for example, launch a phone application in response to a gesture to move the hand up or down when the locked state has been released by a gesture. The controller 10 may, for example, activate the camera 12 or 13 in response to a circular hand gesture when the locked state has been released by a gesture. The controller 10 is not limited to the above examples and may perform any other function in response to gesture-based input operations.

Third Embodiment

The predetermined condition is not limited to the above-described condition allowing judgment that the smartphone 1 is wet. The predetermined condition may, for example, be a condition allowing judgment of the surrounding environment. An example of the predetermined condition being a condition allowing judgment of the surrounding environment is described in the third embodiment.

In the present embodiment, the smartphone 1 acquires information allowing judgment of the surrounding environment. For example, the smartphone 1 can acquire the temperature measured by the temperature sensor 20 and/or the humidity measured by the humidity sensor 21 as the information allowing judgment of the surrounding environment. The smartphone 1 judges the surrounding environment on the basis of the acquired temperature and/or humidity, for example, and turns on the proximity sensor 5 in accordance with the judgment result.

For example, when the acquired temperature is higher than a predetermined threshold and the acquired humidity is higher than a predetermined threshold, the smartphone 1 may judge that the surrounding environment satisfies the condition and turn the proximity sensor 5 on. Suppose, for example, that the user uses the smartphone 1 while taking a bath. The temperature and humidity tend to be higher inside the bathroom than outside. Therefore, by setting the temperature and humidity thresholds to thresholds allowing judgment that the smartphone 1 is inside the bathroom, the smartphone 1 can judge whether the surrounding environment is the bathroom on the basis of the acquired temperature and humidity. The smartphone 1 is highly likely to become wet inside the bathroom as the user takes a shower or bath. Therefore, when the surrounding environment satisfies the condition, the smartphone 1 judges that the surrounding environment is the bathroom and turns the proximity sensor 5 on, allowing receipt of gesture input. In other words, the smartphone 1 automatically enters a state enabling receipt of gesture input, without requiring a specific input operation from the user. The smartphone 1 according to the present embodiment thus has improved convenience.

For example, when the acquired temperature is lower than a predetermined threshold and the acquired humidity is lower than a predetermined threshold, the smartphone 1 may judge that the surrounding environment satisfies the condition and turn the proximity sensor 5 on. When going out in the winter, for example, the user might wear gloves. However, the smartphone 1 cannot perform fingerprint authentication on a gloved hand, and input to the touchscreen 2B might not be received correctly. On the other hand, the user might find it troublesome to take off a glove in order to operate the smartphone 1. Therefore, when the acquired temperature is lower than a predetermined threshold (such as 0 degrees C.) and the acquired humidity is lower than a predetermined threshold (such as 20%), the smartphone 1 may infer that the user is wearing gloves and turn the proximity sensor 5 on. In this way, the smartphone 1 enters a state enabling receipt of gesture input. In other words, the smartphone 1 automatically enters a state enabling receipt of gesture input, without requiring a specific input operation from the user. The smartphone 1 according to the present embodiment thus has improved convenience.

Figure 19:
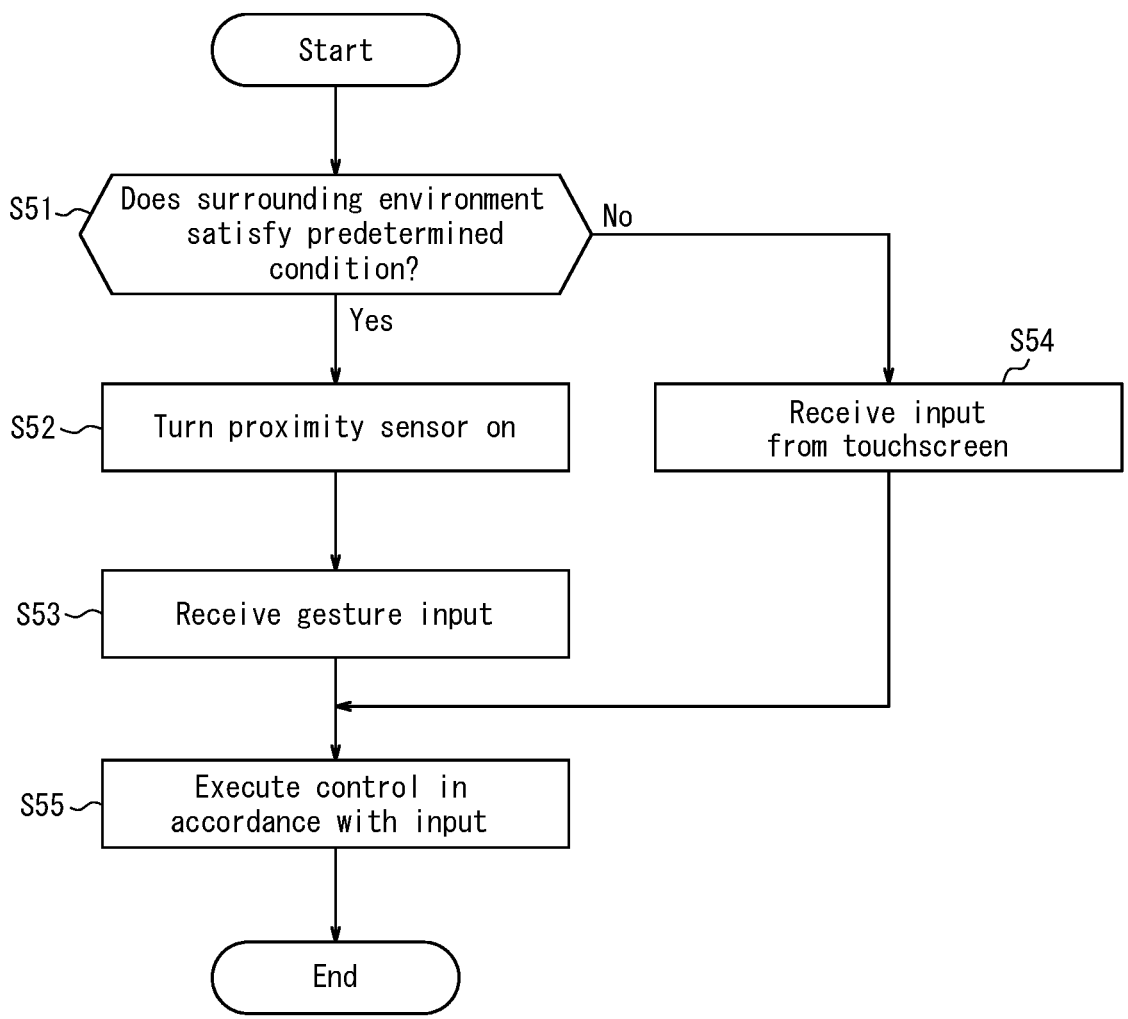
FIG. 19 is a flowchart illustrating an example of a processing procedure executed by the controller of FIG. 4.

FIG. 19 is a flowchart illustrating an example of a processing procedure executed by the controller 10. The controller 10 may execute the process in FIG. 19 periodically, for example. At the start of the process in FIG. 19, the proximity sensor 5 is assumed to be off.

The controller 10 judges whether a predetermined condition is satisfied by judging whether the surrounding environment satisfies a predetermined condition (step S51). For example, the controller 10 may acquire the temperature measured by the temperature sensor 20 and/or the humidity measured by the humidity sensor 21 and judge whether the surrounding environment satisfies a predetermined condition on the basis of the acquired temperature and/or humidity, as described above.

When it is judged that the surrounding environment satisfies the predetermined condition (step S51: Yes), the controller 10 turns the proximity sensor 5 on (step S52). Gesture detection by the proximity sensor 5 thus begins. For example, after turning the proximity sensor 5 on, the controller 10 may maintain the proximity sensor 5 on for a predetermined time period (such as 5 or 10 minutes).

On the other hand, when it is judged that the surrounding environment does not satisfy the predetermined condition (step S51: No), the controller 10 maintains the proximity sensor 5 off. In this case, the controller 10 can receive input from the touchscreen display 2.

Since step S52 through step S55 in FIG. 19 may be similar to step S22 through step S25 in FIG. 9, a detailed description thereof is omitted.

In the third embodiment, the controller 10 may further perform control on the basis of other input information. For example, suppose that the connector 14 is an earphone jack into which an earphone plug can be plugged, the controller 10 infers that the user is wearing gloves on the basis of the surrounding environment, and the controller 10 detects that an earphone plug has been plugged into the connector 14. When an earphone plug is plugged into the connector 14 in this way, it is inferred that the user intends to play back sound with the smartphone 1. Therefore, when the controller 10 infers that the user is wearing gloves on the basis of the surrounding environment and detects that an earphone plug has been plugged into the connector 14, the controller 10 may turn the proximity sensor 5 on and associate a particular gesture with playback of sound. For example, the controller 10 may associate a gesture to move the hand left or right with playback of sound. The controller 10 performs control to play back sound when detecting the gesture associated with playback of sound. In this way, the user can play back music with a gesture by plugging an earphone plug into the connector 14, without performing an input operation on the touchscreen 2B. The smartphone 1 thus has improved convenience.

Other Embodiments

Although the present disclosure has been described with reference to the drawings and embodiments, it is to be noted that various changes and modifications will be apparent to those skilled in the art based on the present disclosure. Therefore, such changes and modifications are to be understood as included within the scope of the present disclosure. For example, the functions and the like included in the various components, steps, and the like may be reordered in any logically consistent way. Furthermore, components, steps, and the like may be combined into one or divided.

The controller 10 of the above embodiment has been described as turning the proximity sensor 5 on, receiving gesture-based operation input, and executing processing when it is judged that a predetermined condition is satisfied. However, the control by the controller 10 is not limited to this example. The controller 10 may, for example, turn the proximity sensor 5 on in advance. When it is judged that a predetermined condition is satisfied, the controller 10 may then execute processing in accordance with gesture-based operation input. In other words, when judging that the predetermined condition is not satisfied, the controller 10 in this case can receive gesture-based operation input but does not execute processing in accordance with gesture-based operation input. When it is judged that the predetermined condition is satisfied, the controller 10 executes processing in accordance with gesture-based operation input. This configuration as well improves convenience by automatically enabling gesture-based input when, for example, the smartphone 1 is wet.

In the above embodiment, gestures have been described as being detected by the proximity sensor 5, but gestures do not necessarily have to be detected by the proximity sensor 5. Gestures may be detected by any non-contact sensor that can detect user gestures with any appropriate non-contact method. Examples of non-contact sensors include the camera 13 and the illuminance sensor 4.

Much of the subject matter of the present disclosure is described as a series of operations executed by a computer system and other hardware that can execute program instructions. Examples of the computer system and other hardware include a general-purpose computer, a personal computer (PC), a dedicated computer, a workstation, a personal communications system (PCS), a mobile (cellular) phone, a mobile phone with a data processing function, an RFID receiver, a game device, an electronic notepad, a laptop computer, a global positioning system (GPS) receiver, and other programmable data processing apparatuses. It should be noted that in each embodiment, various operations or control methods are executed by a dedicated circuit (for example, individual logical gates interconnected in order to execute a particular function) implemented by program instructions (software), or by a logical block and/or program module or the like executed by one or more processors. The one or more processors that execute a logical block and/or program module or the like include, for example, one or more of a microprocessor, CPU, application specific integrated circuit (ASIC), digital signal processor (DSP), programmable logic device (PLD), FPGA, processor, controller, microcontroller, microprocessor, electronic device, other apparatus designed to be capable of executing the functions disclosed here, and/or a combination of any of the above. The embodiments disclosed here are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or memory content to or from another code segment or hardware circuit in order for the code segment to connect to another code segment or hardware circuit.

The storage 9 used here may also be configured as a computer-readable, tangible carrier (medium) in any of the categories of solid-state memory, magnetic disks, and optical discs. Data structures or an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic or optical storage medium, such as a CD, Laser Disc®, DVD®, Floppy® disk, and Blu-ray Disc® (laser disc, DVD, floppy, and Blu-ray disc are registered trademarks in Japan, other countries, or both). Further examples include a portable computer disk, random access memory (RAM), read-only memory (ROM), rewritable programmable ROM such as erasable programmable read-only memory (EPROM), electrically erasable programmable read-only memory (EEPROM), or flash memory, another tangible storage medium that can store information, or a combination of any of these. The memory may be provided internal and/or external to a processor or processing unit. As used in the present disclosure, the term "memory" refers to all types of long-term storage, short-term storage, and volatile, non-volatile, or other memory. In other words, the "memory" is not limited to a particular type and/or number. The type of medium on which information is stored is not limited, either.

The invention claimed is:

1. An electronic device comprising:
   a proximity sensor;
   a touch sensor; and
   a controller configured to execute processing on the basis of a gesture detected by the proximity sensor when it is judged that the electronic device is wet on the basis of an output of the touch sensor,
   wherein the controller is configured to execute processing to release a lock on the basis of a gesture detected by the proximity sensor, and to not execute a portion of functions executable by the electronic device involving personal information and money transfer even if user input for these functions is received when the lock is released on the basis of the gesture.

2. The electronic device of claim 1, wherein the controller is configured to enable receipt of a predetermined operation in response to a gesture-based input operation when the lock is released on the basis of the gesture.

3. A non-transitory computer-readable recording medium including computer program instructions to be executed by an electronic device comprising a proximity sensor, a touch sensor, and a controller, the instructions causing the electronic device to:
   execute processing, using the controller, on the basis of a gesture detected by the proximity sensor when it is judged that the electronic device is wet on the basis of an output of the touch sensor,
   wherein the controller is configured to execute processing to release a lock on the basis of a gesture detected by the proximity sensor, and to not execute a portion of functions executable by the electronic device involving personal information and money transfer even if user input for these functions is received when the lock is released on the basis of the gesture.

4. A control method for an electronic device comprising a proximity sensor, a touch sensor, and a controller, the control method comprising:
   executing processing, using the controller, on the basis of a gesture detected by the proximity sensor when it is judged that the electronic device is wet on the basis of an output of the touch sensor,
   wherein the controller is configured to execute processing to release a lock on the basis of a gesture detected by the proximity sensor, and to not execute a portion of functions executable by the electronic device involving personal information and money transfer even if user input for these functions is received when the lock is released on the basis of the gesture.

* * * * *